(12) United States Patent
Shimizu

(10) Patent No.: US 9,789,861 B2
(45) Date of Patent: Oct. 17, 2017

(54) BRAKING FORCE CONTROL SYSTEM FOR VEHICLE

(75) Inventor: Satoshi Shimizu, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/232,156

(22) PCT Filed: Jul. 13, 2012

(86) PCT No.: PCT/IB2012/001378
§ 371 (c)(1),
(2), (4) Date: Jan. 10, 2014

(87) PCT Pub. No.: WO2013/008090
PCT Pub. Date: Jan. 17, 2013

(65) Prior Publication Data
US 2014/0142831 A1    May 22, 2014

(30) Foreign Application Priority Data

Jul. 14, 2011    (JP) .................................. 2011-155757

(51) Int. Cl.
*B60T 8/24*    (2006.01)
*B60T 8/1764*    (2006.01)
*B60T 8/26*    (2006.01)

(52) U.S. Cl.
CPC ............ *B60T 8/246* (2013.01); *B60T 8/1764* (2013.01); *B60T 8/26* (2013.01)

(58) Field of Classification Search
CPC ........... B60T 8/1764; B60T 8/26; B60T 8/246
USPC .................................................... 701/70–75
See application file for complete search history.

(56) References Cited

U.S. PATENT DOCUMENTS

| 4,852,009 A |   | 7/1989 | Jonner et al. |
| 5,498,071 A | * | 3/1996 | Oikawa et al. ............... 303/149 |
| 6,003,959 A | * | 12/1999 | Katayose .............. B60T 8/1755 303/140 |
| 6,219,610 B1 | * | 4/2001 | Araki .................... B60T 8/1755 303/140 |

(Continued)

FOREIGN PATENT DOCUMENTS

| EP | 1 101 675 | 5/2001 |
| JP | 62 178464 | 8/1987 |

(Continued)

OTHER PUBLICATIONS

International Search Report dated Oct. 19, 2012 in PCT/IB12/001378 Filed Jul. 13, 2012.

*Primary Examiner* — Nga X Nguyen
(74) *Attorney, Agent, or Firm* — Oblon, McClelland, Maier & Neustadt, L.L.P.

(57) ABSTRACT

In a braking force control system for a vehicle having a braking system capable of controlling braking force of each of right and left front wheels and right and left rear wheels independently of one another, when anti-skid control starts being performed on one of the front wheels while the vehicle is running on a road having different coefficients of friction on the left side and right side thereof, increase of the braking force of the other front wheel laterally opposite to the above-indicated one front wheel is suppressed, and increase of the braking force of at least one of the right and left rear wheels is suppressed.

15 Claims, 13 Drawing Sheets

(56) References Cited

U.S. PATENT DOCUMENTS

| | | | |
|---|---|---|---|
| 6,375,280 B1 | 4/2002 | Poggenburg et al. | |
| 2007/0188020 A1* | 8/2007 | Schmidt | B60T 8/1764 303/149 |
| 2008/0007115 A1* | 1/2008 | Mizutani | 303/113.2 |
| 2009/0095551 A1 | 4/2009 | Sawada et al. | |
| 2011/0077834 A1* | 3/2011 | Kudo | B60T 8/1764 701/72 |

FOREIGN PATENT DOCUMENTS

| | | |
|---|---|---|
| JP | 8 192729 | 7/1996 |
| JP | 9 249111 | 9/1997 |
| JP | 2009 107614 | 5/2009 |
| WO | 2006 006453 | 1/2006 |

* cited by examiner

BRAKING FORCE CONTROL SYSTEM FOR VEHICLE

BACKGROUND OF THE INVENTION

1. Field of the Invention

The invention relates to a braking force control system for a vehicle, and more particularly to a braking force control system for a vehicle having a braking system capable of controlling braking force of each of front and rear wheels independently of one another as needed.

2. Description of Related Art

In a vehicle, such as an automobile, which has a braking system capable of controlling the braking force of each of the wheels independently of one another, when braking force of any of the wheels becomes excessively large, and an excessive large slip or skid occurs to the wheel, anti-skid control is performed in which the braking force of the wheel concerned is increased or reduced so as to reduce the slip.

When the vehicle is running on a so-called "split μ road" having different coefficients of friction on the left side and right side thereof, an excessively large slip is likely to occur to the wheel(s) on the side having the lower coefficient of friction; therefore, anti-skid control is performed only on one of the front wheels. As a result, a difference appears between the braking forces of the right and left front wheels, and an extra yawing moment is applied to the vehicle due to the difference in the braking force.

In order to reduce the extra yawing moment applied to the vehicle due to the anti-skid control when the vehicle is running on the split μ road, it has been proposed to suppress increase of the difference between the braking forces of the right and left front wheels when anti-skid control starts being performed on one of the front wheels. For example, when anti-skid control starts being performed on one of the front wheels, it is known to suppress increase of the braking force of the other front wheel laterally opposite to the above-indicated one front wheel. Also, according to a known technology as described in Japanese Patent Application Publication No. 9-249111 (JP 9-249111 A), if it is determined that the vehicle is running on a split μ road, increase of the braking force of the front wheel on the side of the road having the higher coefficient of friction is suppressed.

In the braking force control system of the related art as described above, when the brakes are applied while the vehicle is running on a split μ road, increase of the braking force of the front wheel on the side of the road having the higher coefficient of friction is suppressed, so that the difference between the braking forces of the right and left front wheels can be reduced. It is thus possible to reduce the extra yawing moment applied to the vehicle due to the difference between the braking forces of the right and left front wheels.

In the braking force control system of the related art, however, only the braking forces of the front wheels are controlled; therefore, under a situation where the force that can be generated by the rear wheels is reduced due to load shift toward the front of the vehicle due to braking, the braking force of the rear wheels is increased according to a driver's braking operation. Therefore, the rear wheels have a reduced capacity or capability of generating lateral force, and the lateral force of the rear wheels tends to be insufficient. In particular, this phenomenon is likely to occur when the brakes are applied to the vehicle during turning where the outer rear wheel is on the side of the road having the lower coefficient of friction.

SUMMARY OF THE INVENTION

The invention has been developed in view of the above-described problem encountered during running of the vehicle on a split μ road when increase of the braking force of only the front wheel on the side of the road having the higher coefficient of friction is suppressed. Thus, the invention provides a braking force control system for a vehicle, which reduces an extra yawing moment applied to the vehicle due to anti-skid control of one of the front wheels while the vehicle is running on a split μ road, and also reduces a possibility of insufficient lateral force of the rear wheels as compared with the case of the braking force control system of the related art.

According to one aspect of the invention, in a braking force control system for a vehicle having a braking system capable of controlling braking force of each of right and left front wheels and right and left rear wheels independently of one another as needed, when anti-skid control starts being performed on one of the front wheels while the vehicle is running on a road having different coefficients of friction on the left side and right side thereof, increase of the braking force of the other front wheel laterally opposite to the above-indicated one of the front wheels is suppressed, and increase of the braking force of at least one of the right and left rear wheels laterally opposite to the above-indicated one front wheel is suppressed.

With the above arrangement, since the increase of the braking force of at least one of the right and left rear wheels laterally opposite to the above-indicated one front wheel is suppressed, lateral force is more likely to be generated in the rear wheels, and the possibility of insufficient lateral force of the rear wheels is reduced, thus assuring improved running stability of the vehicle. Also, since the increase of the braking force of the front wheel laterally opposite to the above-indicated one front wheel is suppressed, an extra yawing moment applied to the vehicle due to a difference between the braking forces of the right and left wheels can be reduced, and this effect is not impaired by the suppression of increase of the braking forces of the rear wheels.

In particular, the above-described effect may be improved when the increase of the braking force of the rear wheel laterally opposite to the above-indicated one front wheel is suppressed by a greater degree than that of the braking force of the other rear wheel, or when the increase of the braking force of only the rear wheel laterally opposite to the above-indicated one front wheel is suppressed. Also, when the increase of the braking forces of both of the right and left rear wheels is suppressed, the rear wheels have an increased capacity of generating lateral force, as compared with the case where the increase of the braking force of only one of the rear wheels is suppressed. Also, the possibility that anti-skid control starts being performed on the rear wheel on the same side as the above-indicated front wheel can be reduced.

In the braking force control system according to the above aspect of the invention, a degree of suppression of the increase of the braking force of the other front wheel may be lower than that in the case where increase of the braking force of the rear wheel(s) is not suppressed.

With the above arrangement, the increase of the braking force of the front wheel laterally opposite to the front wheel under anti-skid control is suppressed by a smaller degree as compared with the case where the increase of the braking force of the rear wheel(s) is not suppressed, whereby the braking force of the front wheel is allowed to increase at a relatively high rate. Generally, in a vehicle, such as an automobile, the braking force sharing ratio of the front wheels is set to be higher than that of the rear wheels. Therefore, if the increase of the braking force of only the front wheel is largely suppressed, the braking force of the front wheel having the higher braking force sharing ratio is reduced to be lower than the original or intended value, and the braking force applied to the vehicle as a whole is largely changed in a direction in which the braking force is reduced. On the other hand, with the above arrangement, the suppression of the increase of the braking force of the front wheel has a reduced influence on the braking force of the vehicle as a whole, as compared with the case of the braking force control system of the related art. Thus, an adverse influence is less likely to appear in the running behavior of the vehicle, and the braking distance is less likely to be increased due to an insufficient deceleration of the vehicle.

In the braking force control system as described above, when anti-skid control starts being performed on the above-indicated one front wheel while the vehicle is running on the road having different coefficients of friction on the left side and right side thereof, the braking force of the other front wheel may be reduced, and then increased at a reduced rate.

With the above arrangement in which the braking force of the other front wheel laterally opposite to the above-indicated one front wheel is reduced, the extra yawing moment applied to the vehicle due to a difference between the braking forces of the right and left front wheels can be effectively reduced, as compared with the case where the braking force of the other front wheel is not reduced.

In the braking force control system as described above, when anti-skid control starts being performed on the above-indicated one front wheel while the vehicle is running on the road having different coefficients of friction on the left side and right side thereof, the braking force of the rear wheel(s) is reduced, and then increased at a reduced rate.

With the above arrangement, the braking force of each of the rear wheels, of which the increase of the braking force is suppressed, is reduced, so that the rear wheel has an effectively increased capability of generating lateral force, as compared with the case where the braking force of the rear wheel is not reduced. Accordingly, the extra yawing moment applied to the vehicle due to a difference between the braking forces of the right and left front and rear wheels can be effectively reduced. In particular, when the braking force of the rear wheel on the same side as viewed in the lateral direction as the above-indicated one front wheel is reduced, the possibility that anti-skid control starts being performed on the rear wheel can be effectively reduced.

In the braking force control system as described above, the braking forces of the right and left rear wheels may be controlled to the same value.

With the above arrangement, the braking forces of the right and left rear wheels are controlled to the same value; therefore, if anti-skid control starts being performed on one of the front wheels, the suppression of increase of the braking forces of the right and left rear wheels can be started at the same time. By starting and executing the suppression of increase of the braking forces of both of the right and left rear wheels at the same time, the rear wheels have an increased capacity or capability of generating lateral forces, so that the possibility of insufficient lateral forces of the rear wheels can be effectively reduced. Also, as compared with the case where the braking force of the rear wheel on the same side as the above-indicated one front wheel as viewed in the lateral direction is higher than the braking force of the other rear wheel, the possibility that anti-skid control starts being performed on the rear wheel on the same side as the one front wheel can be effectively reduced.

In the braking force control system as described above, when the braking force of the above-indicated one front wheel is continuously increased under anti-skid control, and a magnitude of a difference between the braking forces of the right and left front wheels is equal to or smaller than a reference value, the braking force of the other front wheel may be increased in accordance with the increase of the braking force of the above-indicated one front wheel.

With the above arrangement, the suppression of increase of the braking force of the front wheel laterally opposite to the above-indicated one front wheel is prevented from being continued for a long time, and the intended deceleration of the vehicle can be resumed early. Also, a difference is less likely or unlikely to appear between the braking forces of the right and left front wheels after the magnitude of difference between the braking forces of the right and left front wheels becomes equal to or smaller than the reference value, and the possibility that an extra yawing moment is applied to the vehicle due to the difference between the braking forces can be effectively reduced.

In the braking force control system as described above, when the anti-skid control performed on the above-indicated one front wheel ends, the suppression of the increase of the braking force of the rear wheel(s) may be finished.

With the above arrangement, the increase of the braking force of the rear wheel(s) is surely prevented from being unnecessarily suppressed, as compared with the case where the increase of the braking force of the rear wheel(s) continues to be suppressed even after anti-skid control on the above-indicated one front wheel ends. Also, the suppression of the increase of the braking force of the rear wheel(s) is finished at an earlier opportunity, so that the intended deceleration of the vehicle can be resumed early.

In the braking force control system as described above, a degree of suppression of the increase of the braking force of each of the wheels of which the increase of the braking force is suppressed may be higher when the above-indicated one front wheel is an outer wheel of the vehicle that is turning, as compared with the case where the above-indicated one front wheel is not the outer wheel of the vehicle that is turning.

When the above-indicated one front wheel is an outer wheel of the turning vehicle, the outer wheels including the one front wheel are on the side of the road having the lower coefficient of friction (which will also be called "lower μ side"), and the inner wheels of the turning vehicle are on the side of the road having the higher coefficient of friction (which will also be called "higher μ side"). Under this situation, it is difficult to ensure lateral force required for turning at the outer wheels of the turning vehicle, and it is therefore necessary to ensure lateral force for turning by suppressing the braking force at the inner wheels of the turning vehicle.

With the above arrangement, the degree of suppression of the increase of the braking forces of the wheels is higher when the above-indicated one front wheel is an outer wheel that is turning, as compared with the case where the one front wheel is not an outer wheel; therefore, the braking forces of the wheels laterally opposite to the above-indicated one front wheel are less likely to be increased. Accordingly, even when the above-indicated one front wheel is an outer wheel of the turning vehicle, the possibility that lateral force for turning required to be generated at the turning inner wheels fails to be ensured can be effectively reduced.

In the braking force control system as described above, an amount of reduction of the braking force of each of the wheels of which the braking force is reduced may be larger when the above-indicated one front wheel is an outer wheel of the vehicle that is turning, as compared with the case where the above-indicated one front wheel is not the outer wheel of the vehicle that is turning.

With the above arrangement, the amount of reduction of the braking forces of the wheels is larger when the above-indicated one front wheel is an outer wheel of the turning vehicle, as compared with the case where the one front wheel is not an outer wheel of the turning vehicle; therefore, the braking force of the wheels laterally opposite to the above-indicated one front wheel can be reduced. Thus, even when the above-indicated one front wheel is an outer wheel of the turning vehicle, the possibility that lateral force for turning required to be generated at the turning inner wheels fails to be ensured can be effectively reduced.

In the braking force control system as described above, a degree of suppression of the increase of the braking force when the above-indicated one front wheel is an outer wheel of the vehicle that is turning is higher as a magnitude of lateral force applied the vehicle during turning is larger.

With the above arrangement, the degree of suppression of the increase of the braking force when the above-indicated one front wheel is an outer wheel of the turning vehicle can be variably set according to load shift in the vehicle lateral direction resulting from turning of the vehicle. Accordingly, the possibility that the lateral force required for turning at the inner wheels fails to be ensured can be further effectively reduced, as compared with the case where the magnitude of the lateral force applied to the vehicle during turning is not taken into consideration.

In the braking force control system as described above, an amount of reduction of the braking force of the wheel when the above-indicated one front wheel is an outer wheel of the vehicle that is turning may be larger as a magnitude of lateral force applied to the vehicle during turning is larger.

With the above arrangement, the amount of reduction of the braking force when the above-indicated one front wheel is an outer wheel of the turning vehicle can be variably set according to load shift in the vehicle lateral direction resulting from turning of the vehicle. Accordingly, the possibility that the lateral force required for turning at the inner wheels fails to be ensured can be further effectively reduced, as compared with the case where the magnitude of the lateral force applied to the vehicle during turning is not taken into consideration.

In one preferred form of the invention, when anti-skid control starts being performed on one of the front wheels, and it is determined that preset conditions concerning the road on which the vehicle is running and which has different coefficients of friction on the left hand and right hand thereof are satisfied, increase of the braking force of the other front wheel laterally opposite to the above-indicated one front wheel is suppressed, and increase of the braking force of at least one of the right and left rear wheels laterally opposite to the above-indicated one front wheel is suppressed.

In another preferred form of the invention, the braking force sharing ratio of the front wheels is set to be higher than the braking force sharing ratio of the rear wheels.

In a further preferred form of the invention, the degree of suppression of the increase of the braking force of the rear wheel(s) is higher than that of the increase of the braking force of the front wheel.

In a still further preferred form of the invention, the amount of reduction of the braking force of the rear wheel(s) when the braking force of the rear wheel(s) is also reduced is larger than that of the braking force of the front wheel.

In a still another preferred form of the invention, the degree of suppression of the increase of the braking force of each of the wheels of which the increase of the braking force is suppressed is lower when the above-indicated one front wheel is an inner wheel of the vehicle that is turning, as compared with the case where the one front wheel is not the inner wheel of the vehicle that is turning.

In another preferred form of the invention, the amount of reduction of the braking force of each of the wheels of which the braking force is reduced is smaller when the above-indicated one front wheel is an inner wheel of the vehicle that is turning, as compared with the case where the one front wheel is not the inner wheel of the vehicle that is turning.

In another preferred form of the invention, the degree of suppression of the increase of the braking force when the above-indicated one front wheel is an inner wheel of the vehicle that is turning is lower as the magnitude of lateral force applied to the vehicle during turning is larger.

In another preferred form of the invention, the amount of reduction of the braking force of the wheel when the above-indicated one front wheel is an inner wheel of the vehicle that is turning is smaller as the magnitude of lateral force applied to the vehicle during turning is larger.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENTS

One embodiment of the invention and its modified examples will be described in detail with reference to the accompanying drawings.

Figure 1:
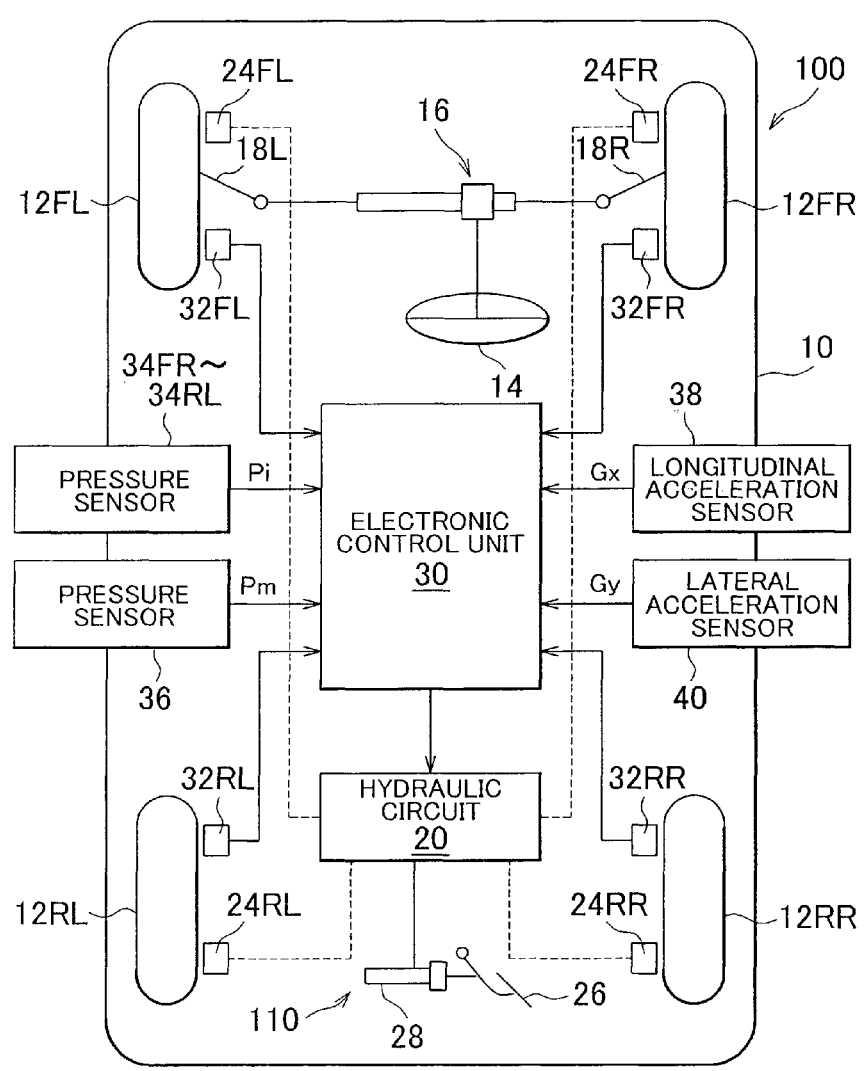
FIG. 1 is a schematic view showing the construction of a braking force control system for a vehicle as one embodiment of the invention.

FIG. 1 is a schematic view showing the configuration of a braking force control system 100 for a vehicle 10 as one embodiment of the invention. The vehicle 10 has right and left front wheels 12FR, 12FL and right and left rear wheels 12RR, 12RL. The right and left front wheels 12FR, 12FL as steerable wheels are arranged to be steered, via tie rods 18R and 18L, by a rack-and-pinion type power steering device that is driven in response to turning of a steering wheel 14 by the driver.

The braking forces applied to the front wheels 12FR, 12FL and the rear wheels 12RR, 12RL are respectively controlled by controlling pressures Pi (i=fr, fl, rr, rl) in corresponding wheel cylinders 24FR, 24FL, 24RR, 24RL, namely the braking pressures of the respective wheels. The braking pressures of the respective wheels are controlled by means of a hydraulic circuit 20 serving as a brake actuator of a braking system 110. Although not illustrated in the drawings, the hydraulic circuit 20 includes an oil reservoir, oil pump, various valve devices, and so forth. An electronic control unit 30 controls the hydraulic circuit 20 based on, for example, a master cylinder pressure Pm, i.e., a pressure in a master cylinder 28 that is driven when a brake pedal 26 is depressed by the driver.

When the vehicle is at rest, the ground contact loads of the front wheels 12FR, 12FL are higher than those of the rear wheels 12RR, 12RL. Also, the braking force sharing ratio of the front wheels 12FR, 12FL is higher than that of the rear wheels 12RR, 12RL; therefore, even if the braking pressure of each wheel is equal, the braking forces of the front wheels 12FR, 12FL are larger than those of the rear wheels 12RR, 12RL.

The wheels 12FR, 12FL, 12RR, 12RL are respectively provided with wheel speed sensors 32FR, 32FL, 32RR, 32RL for sensing the wheel speeds Vwi (i=fr, fl, rl, rr) of the corresponding wheels, and pressure sensors 34FR, 34FL, 34RR, 34RL for sensing the braking pressures Pi. The master cylinder 28 is provided with a pressure sensor 36 for sensing the master cylinder pressure Pm. The braking pressures Pi of the respective wheels may also be estimated based on operations of various valve devices of the hydraulic circuit 20.

The vehicle 10 is provided with a longitudinal acceleration sensor 38 for sensing the longitudinal acceleration Gx of the vehicle, and a lateral acceleration sensor 40 for sensing the lateral acceleration Gy of the vehicle. The electronic control unit 30 receives signals indicative of values obtained by the respective sensors. The longitudinal acceleration Gx obtained by the longitudinal acceleration sensor 38 takes on positive values when the vehicle is accelerated, and the lateral acceleration Gy obtained by the lateral acceleration sensor 40 takes on positive values when the vehicle turns left.

Although not illustrated in detail, the electronic control unit 30 includes a generally configured microcomputer having CPU, ROM, RAM, buffer memory, and input/output ports, which are connected to each other via a bidirectional common bus.

The electronic control unit 30 estimates the vehicle body speed Vb based on the wheel speed Vwi of each wheel, in a manner known in the technical field of this invention, and computes a braking slip amount SLi (i=fr, fl, rr, rl) for each wheel, as a difference between the estimated vehicle body speed Vb and the wheel speed Vwi. When the braking slip amount SLi is equal to or larger than a preset threshold value $SL_0$, the electronic control unit 30 performs anti-skid control for reducing the braking slip amount by controlling, i.e., increasing or reducing the braking pressure of the wheel concerned.

In this specification, one of the right and left front wheels on which anti-skid control is performed will be called "anti-skid-control side front wheel", and the other front wheel on which anti-skid control is not performed will be called "non-anti-skid-control side front wheel". The anti-skid control may be abbreviated as "ABS control" when appropriate.

Figure 2:
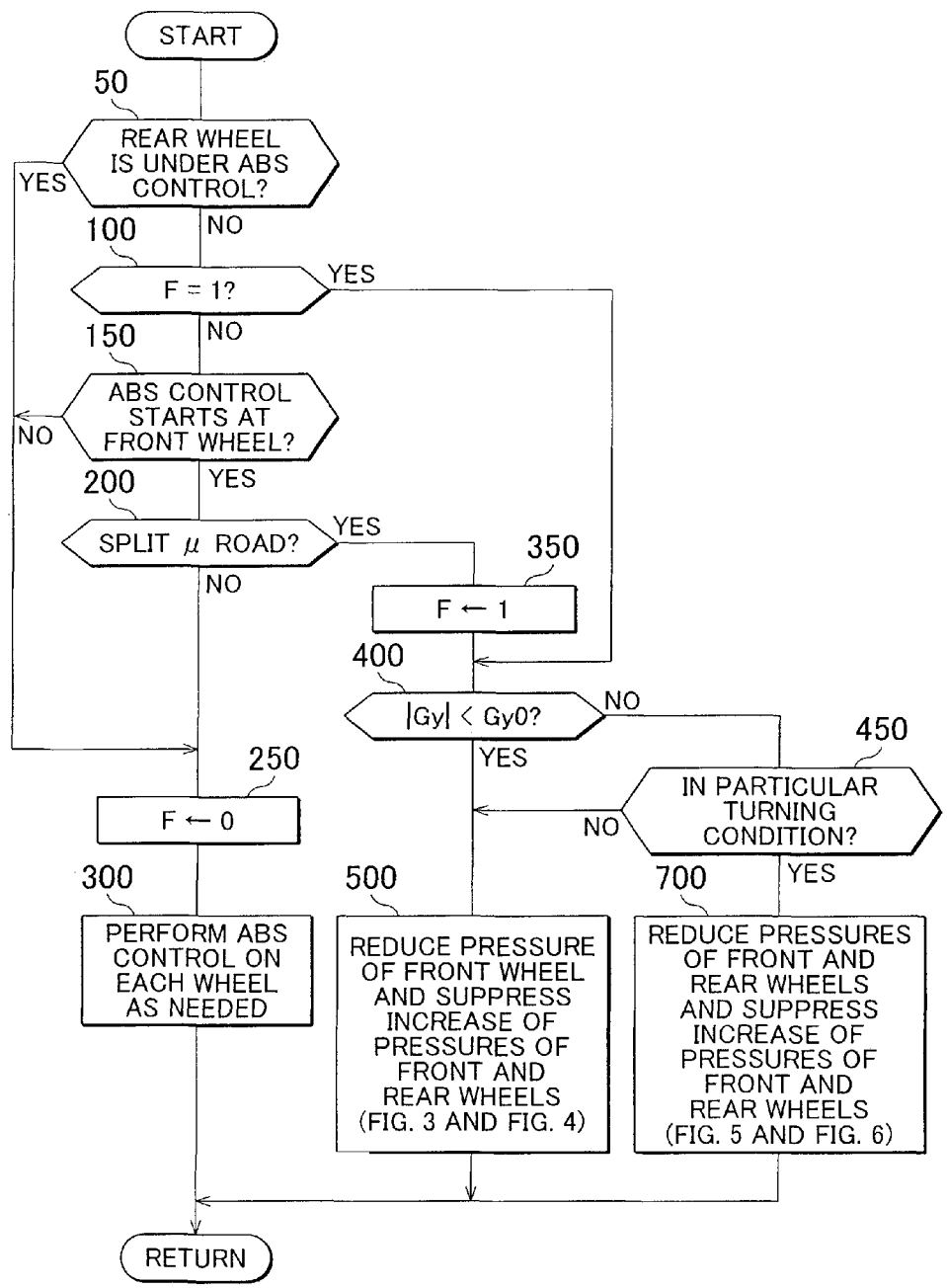
FIG. 2 is a flowchart illustrating a main routine of control for suppressing increase of braking pressures during anti-skid control according to the embodiment of FIG. 1.

The electronic control unit 30 controls the braking force of each wheel, in association with anti-skid control, according to the flowchart shown in FIG. 2, as will be described later in detail. In particular, the electronic control unit 30 determines whether the vehicle is in a condition where anti-skid control starts being performed on one of the right and left front wheels, due to braking on a split μ road. If the electronic control unit 30 determines that the vehicle is in the condition where anti-skid control starts being performed on one of the right and left front wheels, due to braking on a split μ road, the electronic control unit 30 performs control for suppressing increase of the braking pressure, on the front and rear wheels located opposite to the wheel on which anti-skid control is performed as viewed in the lateral direction of the vehicle.

Next, a main routine of control for suppressing increase of braking pressures during anti-skid control according to this embodiment will be described with reference to the flowchart shown in FIG. 2. The control according to the flowchart of FIG. 2 is started when an ignition switch (not shown) is closed, and is repeatedly executed at given time intervals.

Initially, it is determined in step 50 whether anti-skid control is being performed on any one of the rear wheels. If an affirmative decision (YES) is obtained in step 50, the control proceeds to step 250. If a negative decision (NO) is obtained in step 50, the control proceeds to step 100.

In step 100, it is determined whether flag F is 1, namely, whether the control for suppressing increase of braking pressures is being carried out. If an affirmative decision (YES) is obtained in step 100, the control proceeds to step 400. If a negative decision (NO) is obtained in step 100, the control proceeds to step 150.

In step 150, it is determined whether anti-skid control starts being performed on any one of the front wheels. If a negative decision (NO) is obtained in step 150, the control proceeds to step 250. If an affirmative decision (YES) is obtained in step 150, the control proceeds to step 200.

In step 200, it is determined whether the road on which the vehicle is running is a split μ road. If a negative decision (NO) is obtained in step 200, the flag F is reset to 0 in step 250, and then the control proceeds to step 300. If an affirmative decision (YES) is obtained in step 200, the flag F is set to 1 in step 350, and then the control proceeds to step 400.

In this case, it may be determined that the road on which the vehicle is running is a split μ road when all of the following conditions A1-A4 are satisfied. It is, however, to be understood that criteria for determining whether the road on which the vehicle is running is a split μ road are not limited to the following conditions.

Condition A1 is that the longitudinal acceleration Gx of the vehicle is smaller than a reference value Gxb (a negative constant).

Condition A2 is that the wheel acceleration Vwdfa of the front wheel on which anti-skid control is performed is smaller than a reference value Vwdfb (a negative constant).

Condition A3 is that an absolute value |Vwdfl−Vwdfr| of a difference between the wheel accelerations of the right and left front wheels is smaller than a reference value ΔVwdf (a positive constant).

Condition A4 is that where Vwfna represents the wheel speed of the front wheel on which anti-skid control is not performed, a difference between the estimated vehicle body speed Vb and the wheel speed Vwfna is equal to or larger than a reference value ΔVwf (a positive constant).

In step 300, it is determined whether anti-skid control needs to be individually performed on each of the wheels, and anti-skid control is performed on the wheel(s) on which anti-skid control needs to be performed.

In step 400, it is determined whether the absolute value of the lateral acceleration Gy of the vehicle is smaller than a reference value Gy0 (a positive constant). If an affirmative decision (YES) is obtained in step 400, the control proceeds to step 500. If a negative decision (NO) is obtained in step 400, the control proceeds to step 450.

In step 450, it is determined whether the vehicle is in a particular turning condition. If an affirmative decision (YES) is obtained in step 450, the control proceeds to step 700. If a negative decision (NO) is obtained in step 450, the control proceeds to step 500.

In this case, it may be determined that the vehicle is in the particular turning condition when the following conditions B1, B2 are satisfied.

Condition B1 is that the estimated vehicle body speed Vb is higher than a reference value Vbt (a positive constant).

Condition B2 is that the front wheel on which anti-skid control is performed is an outer wheel of the turning vehicle.

Figure 3:
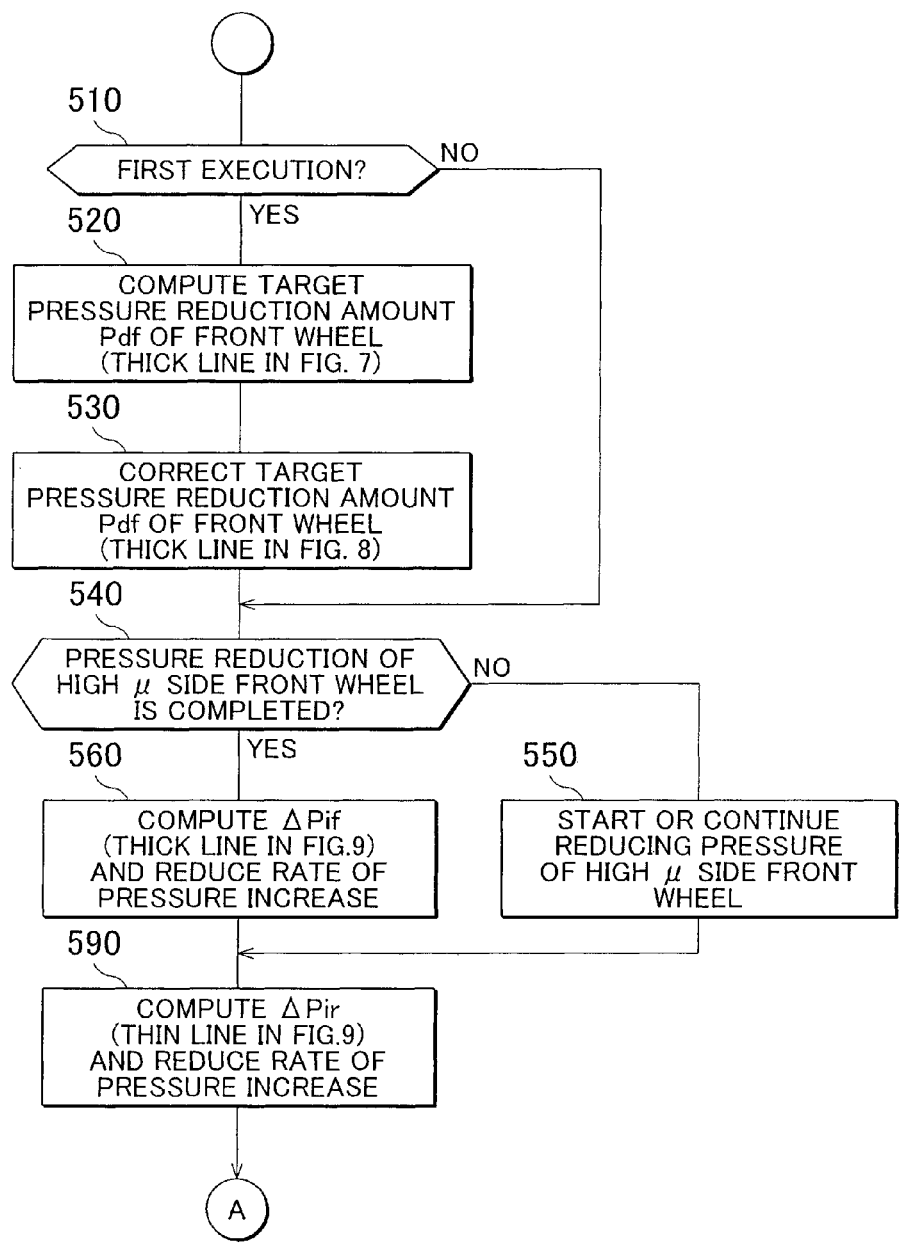
FIG. 3 is a flowchart illustrating the first half of a subroutine executed in step 500 of the braking pressure control routine shown in FIG. 2.
Figure 4:
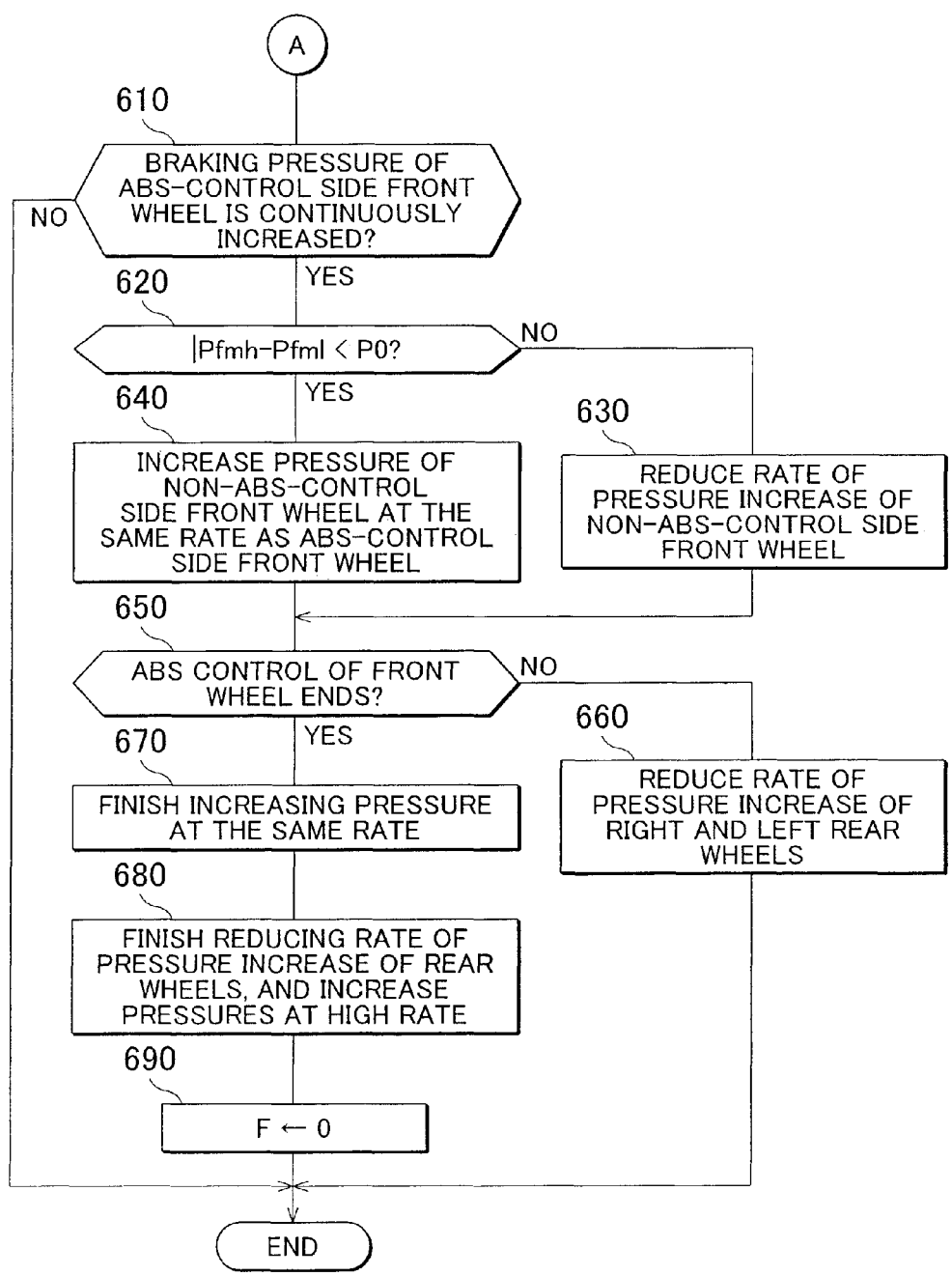
FIG. 4 is a flowchart illustrating the second half of the subroutine executed in step 500 of the braking pressure control routine shown in FIG. 2.

In step 500, the braking pressure of the non-anti-skid-control side front wheel is once reduced, and then increased at a reduced rate, and the braking pressures of the right and left rear wheels are increased at reduced rates without being reduced, according to the flowchart shown in FIG. 3 and FIG. 4.

Figure 5:
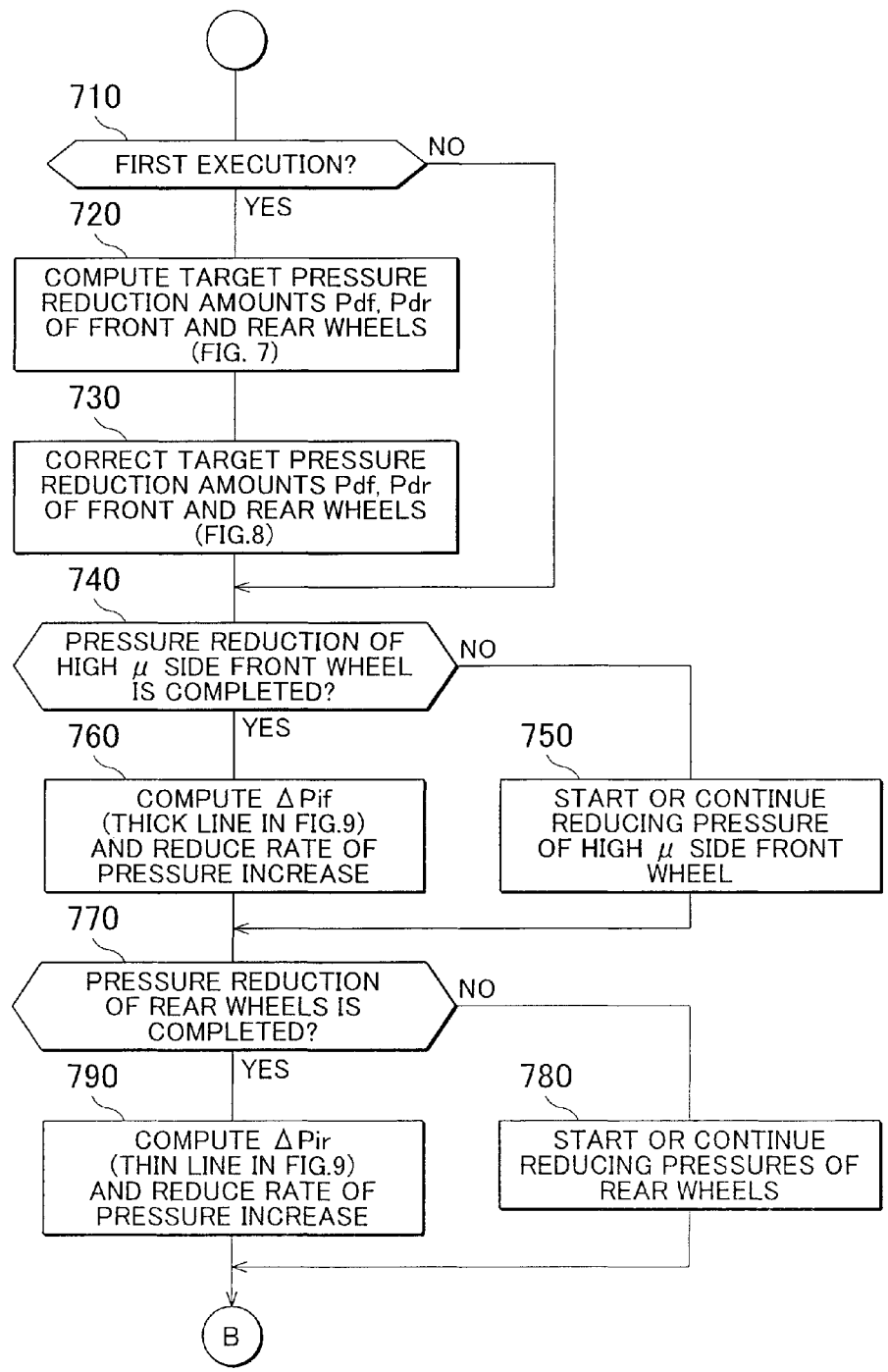
FIG. 5 is a flowchart illustrating the first half of a subroutine executed in step 700 of the braking pressure control routine shown in FIG. 2.
Figure 6:
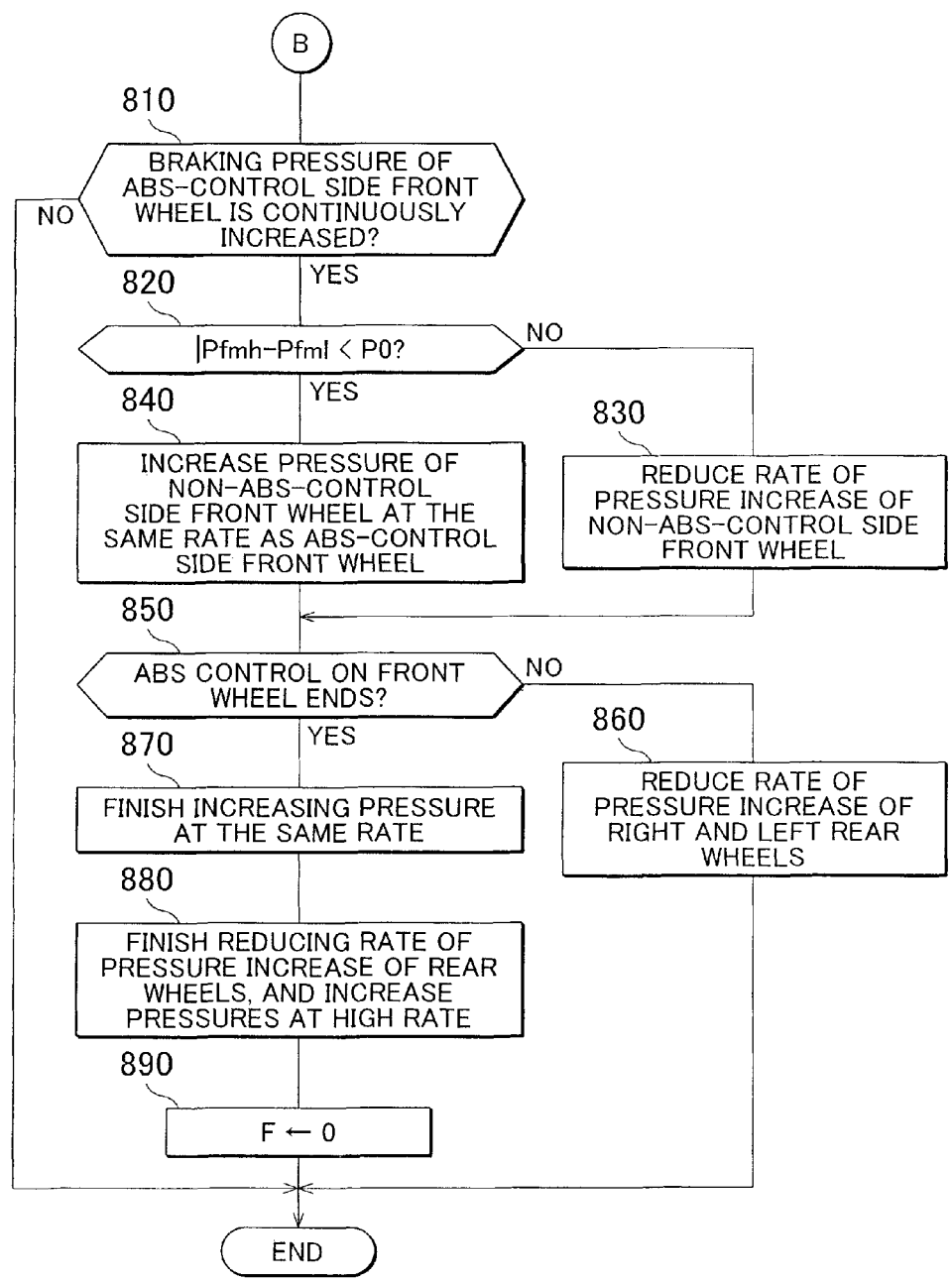
FIG. 6 is a flowchart illustrating the second half of the subroutine executed in step 700 of the braking pressure control routine shown in FIG. 2.

In step 700, the braking pressures of the non-anti-skid-control side front wheel and the right and left rear wheels are once reduced, an then increased at reduced rates, according to the flowchart shown in FIG. 5 and FIG. 6.

Referring next to the flowchart shown in FIG. 3 and FIG. 4, the control for reducing the braking pressure of the non-anti-skid-control side front wheel and the control for suppressing increase of the braking pressures of the front and rear wheels in the case where the vehicle is running substantially straight, or the case where the vehicle is turning but not in a particular turning condition will be described.

In step 510, it is determined whether the control of step 500 is executed for the first time after change of the flag F from 0 to 1. If a negative decision (NO) is obtained in step 510, the control proceeds to step 540. If an affirmative decision (YES) is obtained in step 510, the control proceeds to step 520.

Figure 7:
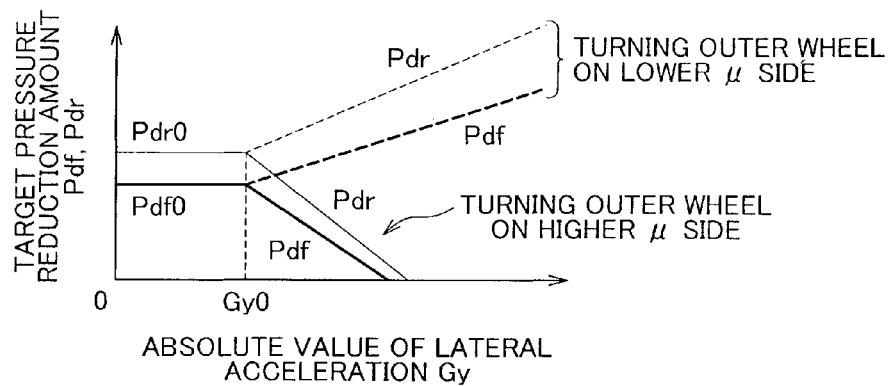
FIG. 7 is a graph indicating the relationship between the absolute value of the lateral acceleration Gy of the vehicle and target pressure reduction amounts Pdf, Pdr.

In step 520, a target amount of pressure reduction Pdf of the front wheel is computed from a map corresponding to a graph indicated by a thick line in FIG. 7, based on the absolute value of the lateral acceleration Gy of the vehicle. In this case, since the absolute value of the lateral acceleration Gy of the vehicle is smaller than the reference value Gy0, the target pressure reduction amount Pdf is set to a constant standard value Pdf0 irrespective of the absolute value of the lateral acceleration Gy.

The above-mentioned standard value Pdf0 is smaller than a standard amount of reduction of the braking pressure of the non-anti-skid-control side front wheel in the case of the braking force control system of the related art in which increase of the braking forces of the rear wheels is not suppressed even if anti-skid control starts being performed on one of the right and left front wheels.

Figure 8:
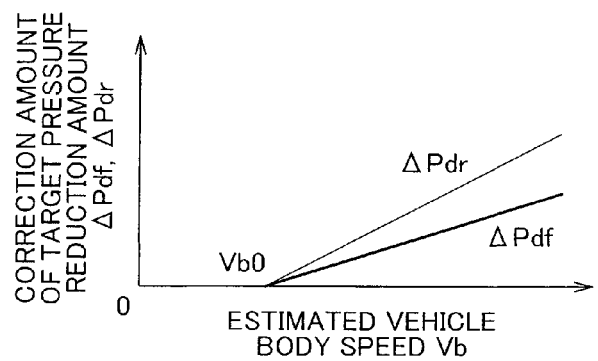
FIG. 8 is a graph indicating the relationship between the estimated vehicle body speed Vb and correction amounts $\Delta Pdf$, $\Delta Pdr$ of the target pressure reduction amounts.

In step 530, the amount of correction ΔPdf of the target pressure reduction amount of the front wheel is computed from a map corresponding to a graph indicated by the thick line in FIG. 8, based on the estimated vehicle body speed Vb as the vehicle speed. Then, the target pressure reduction amount Pdf is corrected by adding the correction amount ΔPdf to the target pressure reduction amount Pdf obtained in step 520. In this case, the correction amount ΔPdf of the target pressure reduction amount is equal to zero when the estimated vehicle body speed Vb is equal to or lower than a reference value Vb0 (a positive constant), and becomes larger as the estimated vehicle body speed Vb is higher when the estimated vehicle body speed Vb is higher than the reference value Vb0.

In step 540, it is determined whether reduction of the braking pressure of the front wheel based on the corrected target pressure reduction amount Pdf is completed. If a negative decision (NO) is obtained in step 540, the control proceeds to step 550 in which the braking pressure of the front wheel starts or continues being reduced at a preset rate. If an affirmative decision (YES) is obtained in step 540, the control proceeds to step 560.

Figure 9:
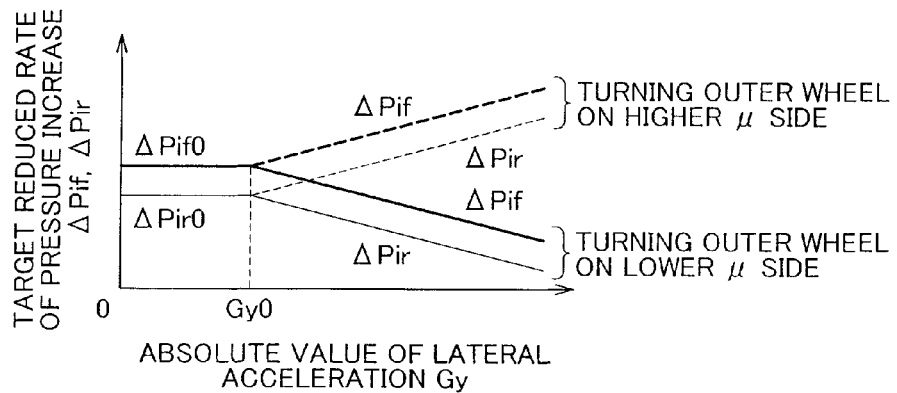
FIG. 9 is a graph indicating the relationship between the absolute value of the lateral acceleration Gy of the vehicle and target reduced rates $\Delta Pif$, $\Delta Pir$ of pressure increase.

In step 560, a target reduced rate of pressure increase ΔPif of the front wheel is computed from a map corresponding to a graph indicated by a thick line in FIG. 9, based on the absolute value of the lateral acceleration Gy of the vehicle. In this case, the absolute value of the lateral acceleration Gy is smaller than the reference value Gy0; therefore, the target reduced rate of pressure increase ΔPif is equal to a constant standard value ΔPif0, irrespective of the absolute value of the lateral acceleration Gy.

The above-mentioned standard value ΔPif0 is larger than a standard reduced rate of increase of the braking pressure of the non-anti-skid-control side front wheel in the case of the braking force control system of the related art in which increase of the braking forces of the rear wheels is not suppressed even if anti-skid control starts being performed on one of the right and left front wheels.

After execution of step 550 or 560, the control proceeds to step 590, in which a target reduced rate ΔPir of pressure increase of the rear wheels is computed from a map corresponding to a graph indicated by a thin line in FIG. 9, based on the absolute value of the lateral acceleration Gy of the vehicle. In this case, the absolute value of the lateral acceleration Gy of the vehicle is smaller than the reference value Gy0; therefore, the target reduced rate of pressure increase ΔPir is equal to a constant standard value ΔPir0 irrespective of the absolute value of the lateral acceleration Gy. The standard value ΔPir0 is smaller than the above-indicated standard value ΔPif0.

In step 610, it is determined whether the braking pressure of the anti-skid-control side front wheel is continuously increased. If a negative decision (NO) is obtained in step 610, the control according to the flowchart shown in FIG. 2 is once finished. If an affirmative decision (YES) is obtained in step 610, the control proceeds to step 620. In this case, it may be determined that the braking pressure of the anti-skid-control-side front wheel is continuously increased when the braking pressure of the anti-skid-control-side front wheel is increased successively over a preset number of cycles or more.

In step 620, it is determined whether the absolute value of a difference between the braking pressure Pfmh of the non-anti-skid-control side (high μ side) front wheel and the braking pressure Pfml of the anti-skid-control side (low μ side) front wheel is smaller than a reference value P0 (a positive constant). If an affirmative decision (YES) is obtained in step 620, the control proceeds to step 640. If a negative decision (NO) is obtained in step 620, the control proceeds to step 630.

In step 630, the braking pressure of the non-anti-skid-control side front wheel is controlled so that the rate of increase of the braking pressure of the non-anti-skid-control side front wheel does not exceed the target reduced rate ΔPif of pressure increase of the front wheel.

In step 640, the braking pressure of the non-anti-skid-control side front wheel is controlled so that the rate of increase of the braking pressure of the non-anti-skid-control side front wheel becomes equal to that of the anti-skid-control side front wheel.

In step 650, it is determined whether the anti-skid control of the anti-skid-control side front wheel is completed. If an affirmative decision (YES) is obtained in step 650, the control proceeds to step 670. If a negative decision (NO) is obtained in step 650, the control proceeds to step 660.

In step 660, the braking pressure of the non-anti-skid-control side front wheel is controlled so that the rate of increase of the braking pressure of the non-anti-skid-control side front wheel does not exceed the target reduced rate of pressure increase ΔPif of the front wheel. Also, the braking pressures of the right and left rear wheels are controlled to the same value so that the rate of increase of the braking pressures of the right and left rear wheels does not exceed the target reduced rate of pressure increase ΔPir of the rear wheels.

In step 670, the control of the braking pressure of the non-anti-skid-control side front wheel, which is performed so that the rate of increase of the braking pressure of the non-anti-skid-control side front wheel becomes equal to that of the anti-skid-control side front wheel, is finished.

In step 680, the control of the braking pressures of the right and left rear wheels, which is performed so that the rate of increase of the braking pressures of the right and left rear wheels does not exceed the target reduced rate of pressure increase ΔPir of the rear wheels, is finished. Then, the braking pressures of the right and left rear wheels are increased for a given period of time, at a preset rate that is higher than the target reduced rate of pressure increase ΔPir.

In step 690, the flag F is reset to 0. After execution of step 660 or step 690, the control returns to step 50.

Referring next to the flowchart shown in FIG. 5 and FIG. 6, control for reducing the braking pressure of the non-anti-skid-control side front wheel and control for suppressing increase of the braking pressures of the front and rear wheels in the case where the vehicle is in a particular turning condition will be described.

In step 710, substantially the same determination as that of step 510 is made. Namely, it is determined whether the control of step 700 is executed for the first time after change of the flag F from 0 to 1. If a negative decision (NO) is obtained in step 710, the control proceeds to step 740. If an affirmative decision (YES) is obtained in step 710, the control proceeds to step 720.

In step 720, the target pressure reduction amount Pdf of the front wheel and the target pressure reduction amount Pdr of the rear wheels are computed from maps corresponding to graphs indicated by a thick line and a thin line in FIG. 7, respectively, based on the absolute value of the lateral acceleration Gy of the vehicle. In this case, if the outer wheels of the turning vehicle are on the low μ side of the road having the lower coefficient μ of friction, the target pressure reduction amounts Pdf and Pdr are equal to or larger than the standard value Pdf0, and increase as the absolute value of the lateral acceleration Gy increases. If, on the other hand, the inner wheels of the turning vehicle are on the low μ side of the road having the lower coefficient μ of friction, the target pressure reduction amounts Pdf and Pdr are equal to or smaller than the standard value Pdf0, and decrease as the absolute value of the lateral acceleration Gy increases. The target pressure reduction amounts Pdf and Pdr become equal to zero when the absolute value of the lateral acceleration Gy is considerably large. In any case, the target reduction amount Pdr of the rear wheels is larger than the target reduction amount Pdf of the front wheel except for the case where the amount Pdr is equal to zero.

In step 730, the correction amounts ΔPdf and ΔPdr of the target pressure reduction amounts of the front and the rear wheels are computed from maps corresponding to graphs indicated by the thick line and thin line in FIG. 8, respectively, based on the estimated vehicle body speed Vb as the vehicle speed. Then, the target reduction amount Pdf of the front wheel is corrected by adding the correction amount ΔPdf to the target pressure reduction amount Pdf obtained in step 720, and the target reduction amount Pdr of the rear wheels is corrected by adding the correction amount ΔPdr to the target pressure reduction amount Pdr obtained in step 720. In this case, the correction amounts ΔPdf and ΔPdr of the target pressure reduction amounts are equal to zero when the estimated vehicle body speed Vb is equal to or lower than the reference value Vb0, and increase as the estimated vehicle body speed Vb increases when the estimated vehicle speed Vb is higher than the reference value Vb0. When the estimated vehicle body speed Vb is higher than the reference value Vb0, the correction amount ΔPdr of the target pressure reduction amount of the rear wheels is larger than the correction amount ΔPdf of the target pressure reduction amount of the front wheel.

In step 740, it is determined whether the reduction of the braking pressure of the front wheel based on the corrected target pressure reduction amount Pdf is completed. If a negative decision (NO) is obtained in step 740, the control proceeds to step 750 in which the braking pressure of the front wheel starts or continues being reduced at a preset rate. If an affirmative decision (YES) is obtained in step 740, the control proceeds to step 760.

In step 760, the target reduced rate of pressure increase ΔPif of the front wheel is computed from a map corresponding to a graph indicated by a thick line in FIG. 9, based on the absolute value of the lateral acceleration Gy of the vehicle. In this case, when the outer wheels of the turning vehicle are on the lower μ side of the road, the target reduced rate of pressure increase ΔPif is equal to or smaller than the standard value ΔPif0, and decreases as the absolute value of the lateral acceleration Gy increases. To the contrary, when the inner wheels of the turning vehicle are on the lower μ side of the road, the target reduced rate ΔPif of pressure increase is equal to or larger than the standard value ΔPif0, and increases as the absolute value of the lateral acceleration Gy increases.

In step 770, it is determined whether the reduction of the braking pressures of the rear wheels based on the corrected target pressure reduction amount Pdr is completed. If a negative decision (NO) is obtained in step 770, the control proceeds to step 780 in which the braking pressures of the rear wheels start or continue being reduced at a preset rate. If an affirmative decision (YES) is obtained in step 770, the control proceeds to step 790.

In step 790, the target reduced rate of pressure increase ΔPir of the rear wheels is computed from a map corresponding to a graph indicated by a thin line in FIG. 9, based on the absolute value of the lateral acceleration Gy of the vehicle. In this case, when the outer wheels of the turning vehicle are on the lower μ side of the road, the target reduced rate of pressure increase ΔPir is equal to or smaller than the standard value ΔPir0, and decreases as the absolute value of the lateral acceleration Gy increases. To the contrary, when the inner wheels of the turning vehicle are on the lower μ side of the road, the target reduced rate of pressure increase ΔPir is equal to or larger than the standard value ΔPir0, and increases as the absolute value of the lateral acceleration Gy increases. In any case, the target reduced rate of pressure increase ΔPir of the rear wheels is smaller than the target reduced rate of pressure increase ΔPif of the front wheel.

After execution of step 780 or step 790, the control proceeds to step 810. Steps 810-890 are executed in the same manners as steps 610-690 as described above. Then, after execution of step 860 or step 890, the control returns to step 50.

Next, the operation of the braking force control system according to the above-described embodiment will be described with respect to the cases where the vehicle is in various running conditions.

(1) When Anti-Skid Control is not Performed on any of the Wheels

Negative decisions (NO) are obtained in steps 50, 100, 150, and it is determined in step 300 whether anti-skid control is required for each of the wheels, and anti-skid control is performed as needed.

(2) When Anti-Skid Controls are Performed on the Front and Rear Wheels

When anti-skid control is performed on one of the front wheels, and anti-skid control is also performed on the rear wheel(s), an affirmative decision (YES) is obtained in step 50. Accordingly, as in the case of (1) above, it is determined in step 300 whether anti-skid control is required for each of the wheels, and anti-skid control is performed as needed.

(3) When Anti-Skid Control is Performed on One of the Front Wheels, and the Road on which the Vehicle is Running is not a Split μ Road Negative decisions (NO) are obtained in steps 50 and 100, an affirmative decision (YES) is obtained in step 150, and a negative decision (NO) is obtained in step 200. Accordingly, as in the case of (1) above, it is determined in step 300 whether anti-skid control is required for each of the wheels, and anti-skid control is performed as needed.

(4) When Anti-Skid Control Starts being Performed on One of the Front Wheels while the Vehicle is Running on a Split μ Road Negative decisions (NO) are obtained in steps 50 and 100, affirmative decisions (YES) are obtained in steps 150 and 200, and the flag F is set to 1 in step 350. In subsequent cycles of the routine of FIG. 2, an affirmative decision (YES) is obtained in step 100.

(4-1) When the Vehicle is Substantially in a Straight Running Condition

When the vehicle is substantially in a straight running condition, the magnitude of the lateral acceleration Gy of the vehicle is small, and therefore, an affirmative decision (YES) is obtained in step 400. Accordingly, step 500, i.e., steps 510-690, are executed, so that the braking pressure of the non-anti-skid-control side front wheel is once reduced and then increased at a reduced rate, and the braking pressures of the right and left rear wheels are increased at a reduced rate without being reduced.

Figure 10:
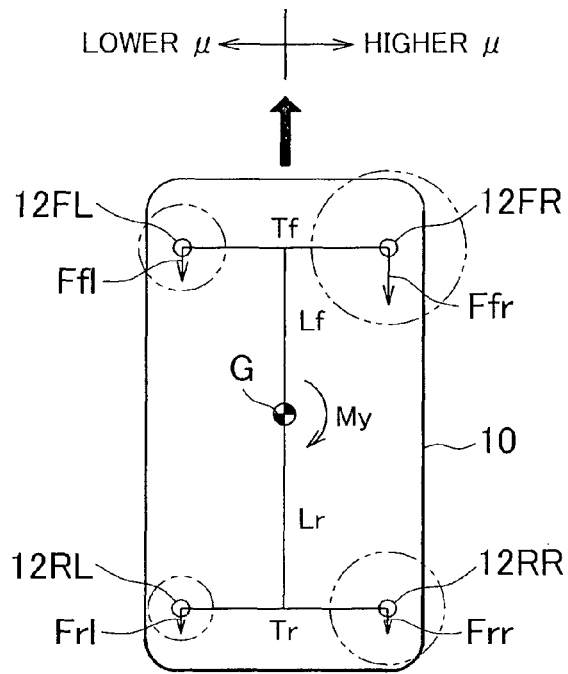
FIG. 10 is an explanatory view showing the case where the brakes are applied while the vehicle is running straight on a split μ road having the lower μ on the left side and the higher μ on the right side.

FIG. 10 illustrates the case where the brakes are applied while the vehicle is running straight on a split μ road having the lower μ (coefficient of friction) on the left side and the higher μ on the right side. In FIG. 10, Tf and Tr denote the treads of the front wheels and rear wheels, respectively, and Lf and Lr denote the distance between the center of gravity G of the vehicle and the axle of the front wheels and the distance between the center of gravity G and the axle of the rear wheels as measured in the longitudinal direction of the vehicle. A circle indicated by a two-dot chain line for each wheel is a so-called "friction circle" representing the magnitude of force that can be generated by each wheel, and My denotes the yawing moment produced around the center of gravity G due to a difference in the braking force between the right and left wheels. These notations also apply to FIG. 12 and FIG. 14 which will be described later.

When the vehicle is substantially in a straight running condition, substantially no lateral force is generated at each wheel as shown in FIG. 10. Accordingly, there is no need to reduce the braking force of the wheels so as to ensure the lateral force of the wheels.

Accordingly, the target pressure reduction amount Pdf of the braking pressure of the non-anti-skid-control side front wheel, or the right front wheel, immediately after anti-skid control starts being performed on the left front wheel is equal to the standard value Pdf0 as shown in FIG. 7. Thus, as shown in the upper half of FIG. 11, the amount of reduction of the braking pressure Pfr of the right front wheel immediately after anti-skid control starts being performed on the left front wheel is smaller than that (indicated by a two-dot chain line) in the case of the braking force control system of the related art in which increase of the braking forces of the rear wheels is not suppressed.

The reduced rate of increase $\Delta$Pif of the braking pressure of the right front wheel is equal to the standard value $\Delta$Pif0 as shown in FIG. 9. As described above, the standard value $\Delta$Pif0 is larger than the standard reduced rate of pressure increase in the case of the braking force control system of the related art in which increase of the braking forces of the rear wheels is not suppressed. Thus, as shown in the upper half of FIG. 11, the rate of increase of the braking pressure of the right front wheel immediately after the reduction of the braking pressure Pfr of the right front wheel is completed is larger than that in the case of the braking force control system of the related art.

The reduced rate $\Delta$Pir of increase of the braking pressures of the right and left rear wheels is equal to the standard value $\Delta$Pir0 as shown in FIG. 9, and the standard value $\Delta$Pir0 is smaller than the standard value $\Delta$Pif0. Thus, as is understood from comparison between the upper half and lower half of FIG. 11, the rate of increase of the braking pressures Prr, Prl of the right and left rear wheels is smaller than that of the braking pressure Pfr of the right front wheel.

(4-2) When the Vehicle is Turning but not in a Particular Turning Condition

When the vehicle is turning but not in a particular turning condition, the magnitude of the lateral acceleration Gy of the vehicle is large; therefore, an affirmative decision (YES) is obtained in step 400, and a negative decision (NO) is obtained in step 450. As a result, step 500 is executed as in the case of (4-1) above, so that the braking pressure of the non-anti-skid-control side front wheel is once reduced and then increased at a reduced rate, and the braking pressures of the right and left rear wheels are increased at a reduced rate without being reduced. The vehicle is turning but not in the particular turning condition when the vehicle is turning at a low vehicle speed, or when the inner wheels of the turning vehicle are on the lower $\mu$ side of the road and the outer wheels of the turning vehicle are on the higher $\mu$ side of the road.

Figure 12:
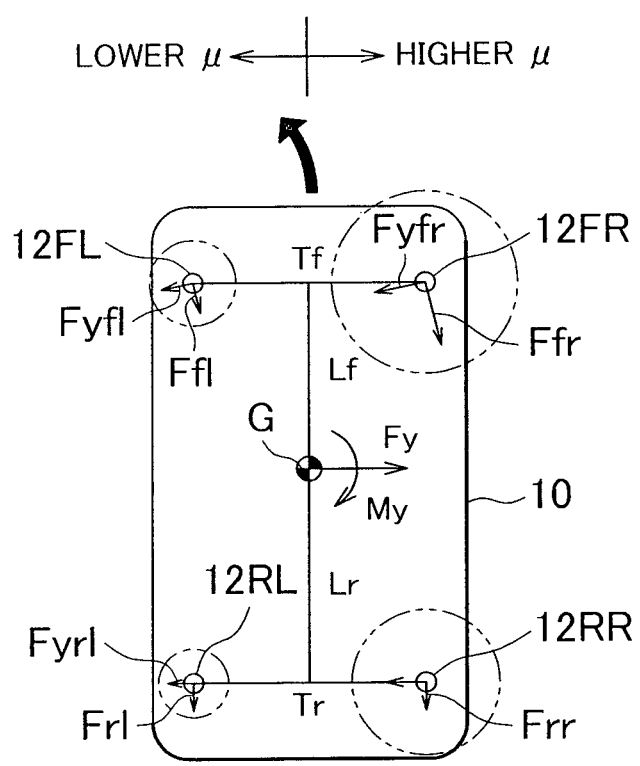
FIG. 12 is an explanatory view showing the case where the brakes are applied while the vehicle is turning left on a split μ road having the lower μ on the left side and the higher μ on the right side.

FIG. 12 illustrates the case where the brakes are applied while the vehicle is turning left on a split $\mu$ road having the lower $\mu$ (coefficient of friction) on the left side and the higher $\mu$ on the right side. In this case, load shift occurs in the lateral direction of the vehicle as well as the longitudinal direction of the vehicle; therefore, the friction circles of the right front and rear wheels as the outer wheels of the turning vehicle become larger, while the friction circles of the left front and rear wheels as the inner wheels of the turning vehicle become smaller, as compared with the case of FIG. 10. In FIG. 12, Fy denotes the centrifugal force produced around the center of gravity G due to turning of the vehicle. This notation also applies to FIG. 15 which will be described later.

In order to turn the vehicle, each of the wheels is required to generate lateral force. Since the resultant of the braking force and the lateral force cannot go beyond the friction circle of each wheel, the braking force must be suppressed as needed so as to ensure the lateral force of the wheel required for turning thereof.

When the vehicle is in a turning condition as shown in FIG. 12, the outer wheels of the turning vehicle are on the higher $\mu$ side of the road, and therefore, required lateral force can be developed at the outer wheels of the turning vehicle. Thus, there is no need to reduce the braking forces of the wheels so as to ensure the lateral forces of the wheels.

Accordingly, the target pressure reduction amount Pdf of the braking pressure of the right front wheel immediately after anti-skid control starts being performed on the left front wheel is smaller than the standard value Pdf0 as shown in FIG. 7. Thus, as shown in the upper half of FIG. 13, the amount of reduction of the braking pressure of the right front wheel immediately after anti-skid control starts being performed on the left front wheel is smaller than that in the case of (4-1) above.

When the vehicle is in the turning condition as shown in FIG. 12, in which the outer wheels of the turning vehicle are on the higher $\mu$ side of the road, the target reduced rate of increase $\Delta$Pif of the non-anti-skid-control side front wheel, or the right front wheel, is larger than the standard value $\Delta$Pif0 as shown in FIG. 9. Thus, as shown in the upper half of FIG. 13, the rate of increase of the braking pressure of the right front wheel after the reduction of the braking pressure of the right front wheel is completed is larger than that in the case of (4-1) above.

Also, the reduced rate of increase $\Delta$Pir of the braking pressures of the right and left rear wheels is larger than the standard value $\Delta$Pir0 as shown in FIG. 9. Thus, as is understood from comparison between the lower half of FIG. 11 and the lower half of FIG. 13, the rate of increase of the braking pressures of the right and left rear wheels is larger than that in the case of (4-1) above.

In the braking force control system of the related art, if anti-skid control starts being performed on any of the rear wheels, so-called "low select control" is performed in which the braking forces of the right and left rear wheels are controlled to the lower one of the braking forces. Also, as shown in FIG. 11, FIG. 13 and FIG. 15, anti-skid control starts being performed on the left front wheel at time t1, and anti-skid control starts being performed on the left rear wheel at time t2.

In the case of the braking force control system of the related art, if anti-skid control is performed on the anti-skid-control side rear wheel, the braking forces of the right and left rear wheels are controlled to the lower one of the braking forces under the "low select control". Accordingly, the braking forces of the right and left rear wheels are inevitably reduced after being once increased immediately after anti-skid control starts being performed on one of the front wheels.

On the other hand, according to the above-described embodiment, the suppression of increase of the braking pressures of the right and left rear wheels is started at time t1, in both of the cases of (4-1) and (4-2) above; therefore, anti-skid control is less likely to start being performed on the anti-skid-control side rear wheel. Thus, the braking forces of the right and left rear wheels are less likely or unlikely to be once increased immediately after anti-skid control starts being performed on one of the front wheels, and then reduced, and the braking forces of the right and left rear wheels are less likely or unlikely to be increased at a high rate even after anti-skid control starts being performed on one of the front wheels. Also, since the braking forces of the right and left rear wheels are not reduced to be smaller than those at time t1 as long as the quantity of braking requested by the driver is not reduced, the deceleration of the vehicle can be prevented from being reduced due to reduction of the braking force of the rear wheels.

Figure 11:
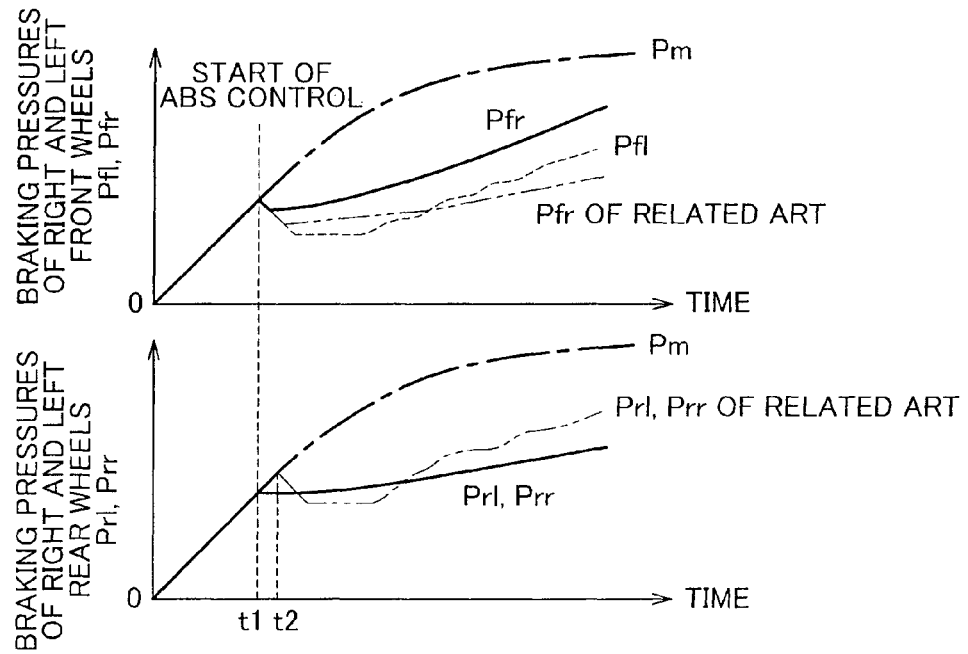
FIG. 11 is a graph showing an example of changes of braking pressures Pfr, Pfl of the right and left front wheels and braking pressures Prr, Prl of the right and left rear wheels in the case of FIG. 10.
Figure 13:
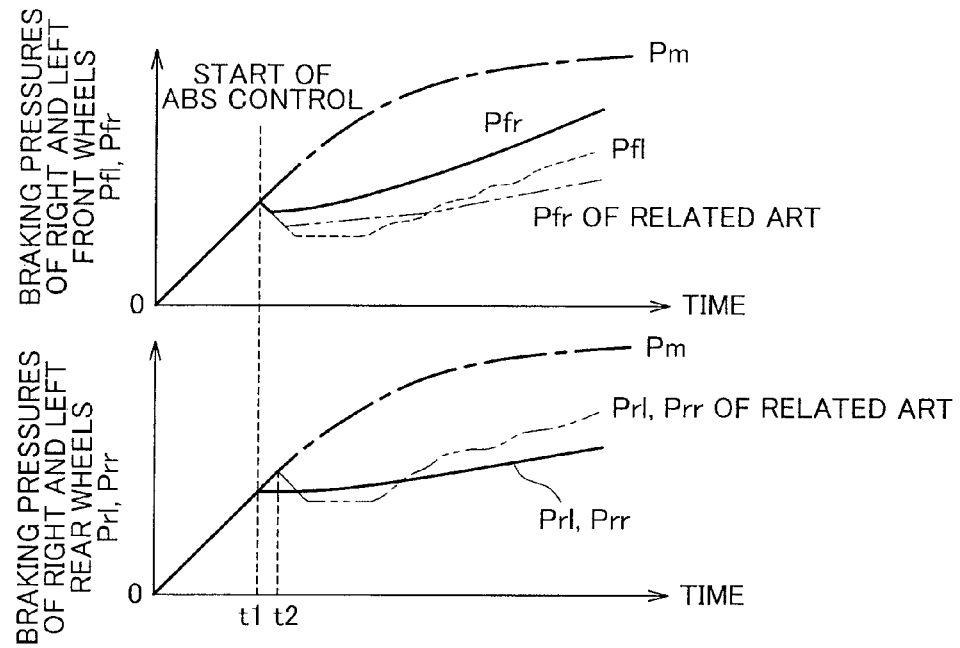
FIG. 13 is a graph showing an example of changes of braking pressures Pfr, Pfl of the right and left front wheels and braking pressures Prr, Prl of the right and left rear wheels in the case of FIG. 12.
Figure 15:
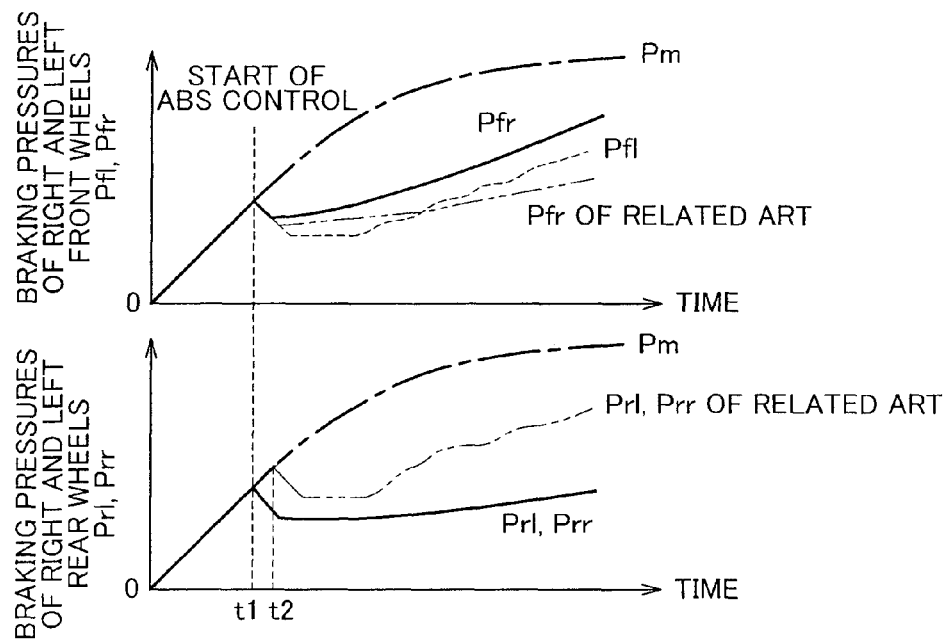
FIG. 15 is a graph showing an example of changes of braking pressures Pfr, Pfl of the right and left front wheels and braking pressures Prr, Prl of the right and left rear wheels in the case of FIG. 14.

In the case of the braking force control system of the related art, the braking forces of the rear wheels are not reduced until time t2 is reached (i.e., are reduced only after time t2), as indicated by two-dot chain lines in the lower halves of FIG. 11, FIG. 13 and FIG. 15, and the rate of increase of the braking forces of the rear wheels is not suppressed after time t2. Also, if anti-skid control is not performed on the left rear wheel, the braking forces of the rear wheels are not reduced.

On the other hand, according to the above-described embodiment, the suppression of increase of the braking pressures of the right and left rear wheels is substantially started at time t1, in both of the cases of (4-1) and (4-2) above, and the increase of the braking forces of the right and left rear wheels can be effectively suppressed irrespective of whether anti-skid control is performed on the rear wheel(s).

Thus, according to the above-described embodiment, the braking force of the non-anti-skid-control side front wheel is made higher than that in the case of the braking force control system of the related art, so that the deceleration of the vehicle is less likely to be reduced. Also, the braking forces of the rear wheels immediately after anti-skid control starts being performed on one of the front wheels can be surely reduced as compared with the case of the braking force control system of the related art; therefore, anti-skid control is less likely or unlikely to start being performed on the anti-skid-control side rear wheel.

Although the braking force of the non-anti-skid-control side rear wheel is not reduced once, the braking force of the non-anti-skid-control side front wheel is once reduced without fail, and then increased at a reduced rate. Accordingly, the yawing moment My produced around the center of gravity G due to a difference in the braking force between the right and left wheels can be reduced.

Although not illustrated in the drawings, when the brakes are applied while the vehicle is turning right on a split μ road having the lower μ (coefficient of friction) on the left side and the higher μ on the right side, the inner wheels of the turning vehicle are on the higher μ side of the road. Accordingly, the target pressure reduction amount Pdf of the braking pressure of the right front wheel that is not under anti-skid control is larger than the standard value Pdf0 as shown in FIG. 7, and the target reduced rate of increase ΔPif is smaller than ΔPif0 as shown in FIG. 9.

(4-3) When the Vehicle is Substantially in a Particular Turning Condition

When the vehicle is substantially in a particular turning condition, a negative decision (NO) is obtained in step 400, and an affirmative decision (YES) is obtained in step 450. Thus, step 700, i.e., steps 710-890, are executed, so that the braking pressures of the non-anti-skid-control side front wheel and right and left rear wheels are once reduced, and then increased at reduced rates. The vehicle is in the particular turning condition when the vehicle speed is high, and the outer wheels of the turning vehicle are on the lower μ side of the road while the inner wheels of the turning vehicle are on the higher μ side of the road.

Figure 14:
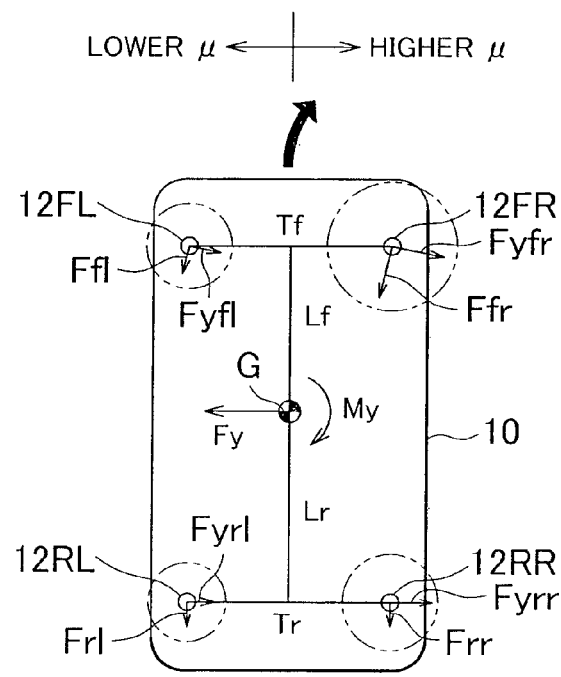
FIG. 14 is an explanatory view showing the case where the brakes are applied while the vehicle is turning right on a split μ road having the lower μ on the left side and the higher μ on the right side.

FIG. 14 illustrates the case where the brakes are applied while the vehicle is turning right on a split μ road having the lower μ (coefficient of friction) on the left side and the higher μ on the right side. In this case, too, load shift occurs in the lateral direction of the vehicle as well as the longitudinal direction of the vehicle; therefore, the friction circles of the left front and rear wheels as the outer wheels of the turning vehicle are larger as compared with those in the case of FIG. 10, while the friction circles of the right front and rear wheels as the inner wheels of the turning vehicle are smaller than those in the case of FIG. 10.

When the vehicle is in the particular turning condition as shown in FIG. 14, the outer wheels of the turning vehicle are on the lower μ side of the road, and the absolute value of the lateral acceleration Gy of the vehicle is larger than the reference value Gy0. Accordingly, the target pressure reduction amount Pdf of the braking pressure of the right front wheel immediately after anti-skid control starts being performed on the left front wheel is larger than the standard value Pdf0 as shown in FIG. 7. Thus, as shown in the upper half of FIG. 15, the amount of reduction of the braking pressure of the right front wheel immediately after anti-skid, control starts being performed on the left front wheel is larger than that in the case of (4-1) above.

The target pressure reduction amount Pdr of the braking pressures of the right and left rear wheels is larger than the standard value Pdr0 as shown in FIG. 7, and increases as the absolute value of the lateral acceleration Gy of the vehicle is larger. Thus, as shown in the lower half of FIG. 15, the braking pressures of the right and left rear wheels are reduced immediately after anti-skid control starts being performed on the left front wheel, and the reduction amount of the braking pressures is larger as the absolute value of the lateral acceleration Gy of the vehicle is larger.

When the vehicle is in the particular turning condition as shown in FIG. 14, the target reduced rate of increase ΔPif of the braking pressure of the right front wheel is smaller than the standard value ΔPif0, and the target reduced rate of increase ΔPir of the braking pressures of the right and left rear wheels is smaller than the standard value ΔPir0. Accordingly, as shown in the upper half of FIG. 15, the rate of increase of the braking pressure of the right front wheel after the reduction of the braking pressure of the right front wheel is completed is smaller than that in the case of (4-1) above. Also, as shown in the lower half of FIG. 15, the rate of increase of the braking pressure of the right and left rear wheels is also smaller than that in the case of (4-1) above.

The braking pressures of the right and left rear wheels are reduced immediately after anti-skid control starts being performed on the left front wheel, and the rate of increase of the braking pressure of the right front wheel is smaller than that in the case of (4-1) above. Thus, as shown in the upper half of FIG. 15, the amount of reduction of the braking pressure of the right front wheel immediately after anti-skid control starts being performed on the left front wheel can be reduced as compared with the case of the braking force control system of the related art, and the braking pressure subsequent to the reduction can be made higher than that in the case of the braking force control system of the related art. Accordingly, the braking force of the non-anti-skid-control side front wheel can be increased, and the deceleration of the vehicle can be increased, as compared with the case of the braking force control system of the related art, whereby the braking distance of the vehicle can be reduced as compared with the case of the braking force control system of the related art.

(4-4) When Anti-Skid Control Starts being Performed on the Rear Wheel

In any case of (4-1) through (4-3) above, if anti-skid control starts, being performed on any of the rear wheels, in particular, the anti-skid-control side rear wheel, an affirmative decision (YES) is obtained in step 50, and the control for reducing the rate of increase of the braking pressure is finished. Thus, the control for reducing the rate of increase of the braking pressure is prevented from being unnecessarily continued even after anti-skid control starts being performed on the rear wheel.

(4-5) When the Braking Pressure of the Anti-Skid-Control Side Front Wheel Continuously Increases When increase of the braking pressure of the non-anti-skid-control side front wheel is suppressed as long as anti-skid control is performed on the anti-skid-control side front wheel, the suppression of increase of the braking pressure of the non-anti-skid-control side front wheel may be unnecessarily continued.

Figure 16:
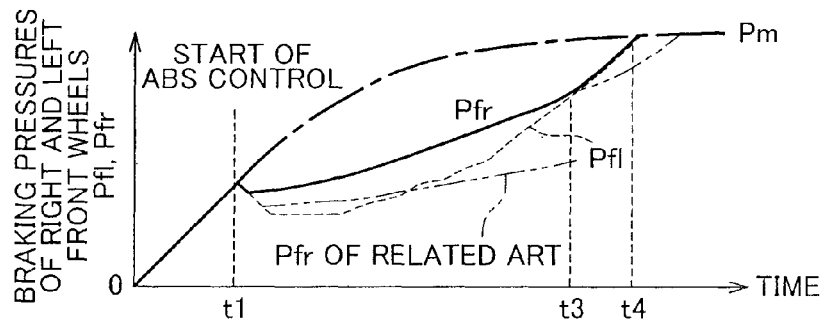
FIG. 16 is a graph showing an example of changes of braking pressures Pfr, Pfl of the right and left front wheels in the case where the braking pressure of the front wheel under anti-skid control is continuously increased.

For example, FIG. 16 shows a situation where, in the case of (4-1) above, the braking slip amount SLfl is reduced due to anti-skid control on the left front wheel, and the braking pressure Pfl is continuously increased; even in this case, the increase of the braking pressure Pfr of the right front wheel is suppressed as long as the anti-skid control is continued. In this case, the suppression of increase of the braking pressure Pfr of the right front wheel is continued even after time t3 at which the braking pressure Pfl of the left front wheel becomes substantially equal to the braking pressure Pfr of the right front wheel. Accordingly, the intended deceleration of the vehicle is resumed with a delay since the braking pressure Pfr of the right front wheel is unnecessarily controlled to a reduced level, and an extra yawing moment is applied to the vehicle in a direction opposite to that of the yawing moment My. In FIG. 16, time t4 represents a point in time at which anti-skid control on the left front wheel is finished.

On the other hand, according to the above-described embodiment, an affirmative decision (YES) is obtained in step 610 of FIG. 4. Then, if the difference between the braking pressure Pfr of the right front wheel that is not under anti-skid control and the braking pressure Pfl of the left front wheel under anti-skid control becomes smaller than the reference value P0, an affirmative decision (YES) is obtained in step 620. In this case, the control proceeds to step 640 in which the braking pressure Pfr of the right front wheel is efficiently increased at the same rate as the braking pressure Pfl of the left front wheel, with no suppression of increase of the braking pressure Pfr.

Thus, the braking pressure Pfr of the right front wheel is increased, after time t3, at a relatively high rate that is equal to the rate of increase of the braking pressure Pfl of the left front wheel, as indicated by the solid line in FIG. 16. Accordingly, the intended deceleration of the vehicle is resumed without delay, and the extra yawing moment is prevented from being applied to the vehicle in the direction opposite to that of the yawing moment My.

(4-6) When Anti-Skid Control of the Front Wheel Ends

Figure 17:
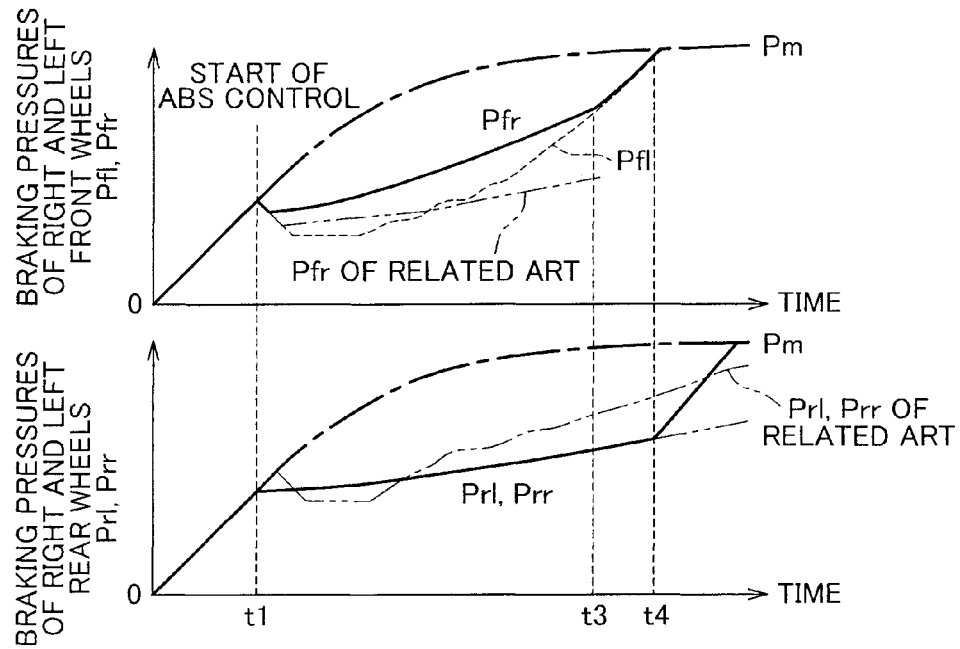
FIG. 17 is a graph showing an example of changes of braking pressures Pfr, Pfl of the right and left front wheels and braking pressures Prr, Prl of the right and left rear wheels when anti-skid control on the front wheel ends.

In the case of the braking force control system of the related art, anti-skid control is performed on the front wheel with no regard to the conditions of the rear wheels, and anti-skid control is performed on the rear wheel with no regard to the conditions of the front wheels. Accordingly, in the case of (4-1) above, anti-skid control may continue to be performed on the rear wheels even after the braking slip amount SLfr of the left front wheel is reduced due to anti-skid control of the left front wheel and the anti-skid control of the left front wheel ends at time t4, as shown in FIG. 17. Therefore, the increase of the braking forces of the right and left rear wheels is suppressed, and the intended deceleration of the vehicle may be resumed with a delay due to insufficient braking force of the vehicle as a whole.

On the other hand, according to the above-described embodiment, an affirmative decision (YES) is obtained in step 650 of FIG. 4. Then, in steps 670 and 680, the braking pressures of the right and left front wheels cease to be increased at the same target reduced rate $\Delta$Pif, and the braking pressures of the right and left rear wheels are increased over a given period of time at a preset rate that is higher than the target reduced rate of pressure increase.

Thus, if the anti-skid control of the left front wheel ends at time t4, as shown in FIG. 17, the braking pressures of the right and left rear wheels are efficiently increased after time t4, so that the braking forces of the right and left rear wheels are efficiently increased. Accordingly, the resumption of the intended deceleration of the vehicle is effectively prevented from being delayed due to insufficient braking force of the vehicle as a whole.

While the split $\mu$ road has the lower $\mu$ (coefficient of friction) on the left side and the higher $\mu$ on the right side, in the explanation of (4-1) through (4-6) above, the same advantageous effects are obtained when the vehicle is turning in the direction opposite to that of the cases of (4-1) through (4-6), on a split $\mu$ road having the higher $\mu$ on the left side and the lower $\mu$ on the right side.

First Modified Example

In the illustrated embodiment, the standard value Pdf0 of the target pressure reduction amount is smaller than the standard pressure reduction amount of the braking pressure of the other front wheels in the case of the braking force control system of the related art in which increase of the braking forces of the rear wheels is not suppressed even if anti-skid control starts being performed on the above-indicated one of the front wheels.

Figure 18:
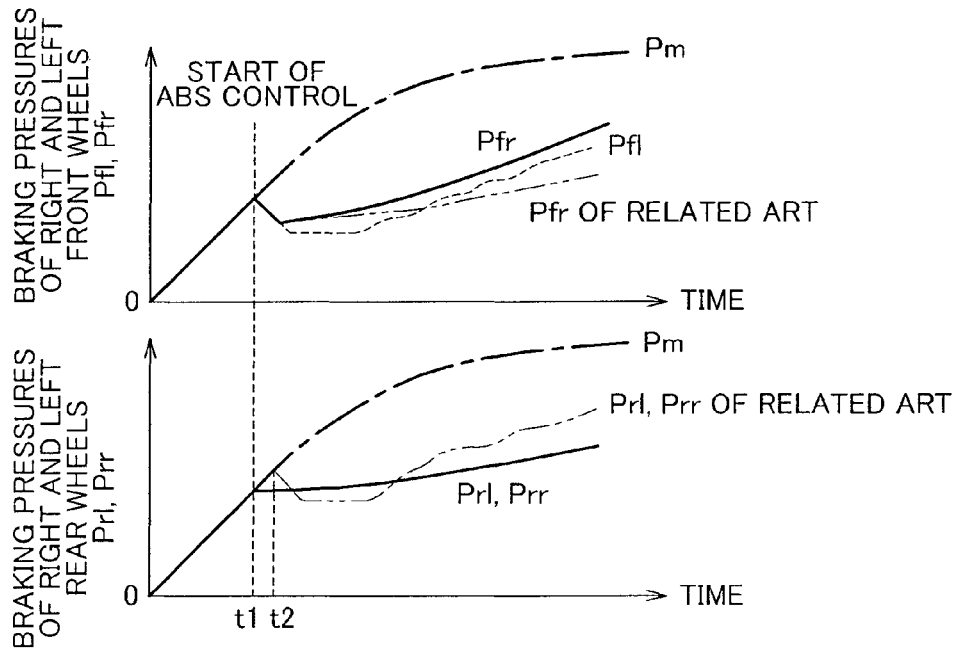
FIG. 18 is a graph showing an example of changes of braking pressures Pfr, Pfl of the right and left front wheels and braking pressures Prr, Prl of the right and left rear wheels when the brakes are applied while the vehicle is running straight on a split μ road having the lower μ on the left side and the higher μ on the right side in a first modified example.
Figure 19:
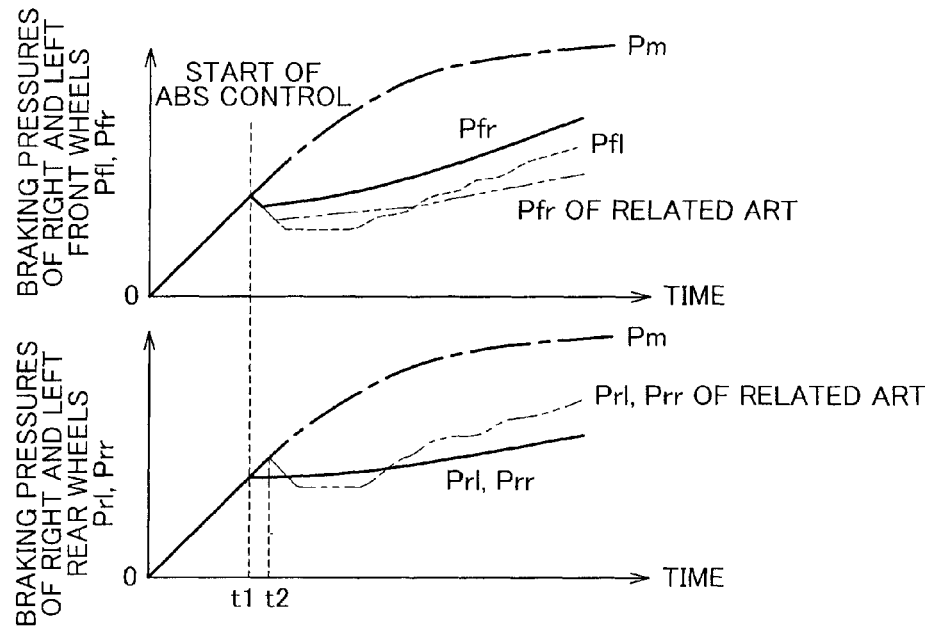
FIG. 19 is a graph showing an example of changes of braking pressures Pfr, Pfl of the right and left front wheels and braking pressures Prr, Prl of the right and left rear wheels when the brakes are applied while the vehicle is running straight on a split μ road having the lower μ on the left side and the higher μ on the right side in a second modified example.

However, when the vehicle is substantially in a straight running condition, the standard value Pdf0 of the target pressure reduction amount may be equal to the standard pressure reduction amount of the braking pressure of the front wheel in the case of the braking force control system of the related art, as shown in FIG. 18.

Second Modified Example

In the illustrated embodiment, the standard value $\Delta$Pif0 of the target reduced rate of pressure increase is larger than the standard reduced rate of increase of the braking pressure of the non-anti-skid-control side front wheel in the case of the braking force control system of the related art.

However, when the vehicle is substantially in a straight running condition, the standard value $\Delta$Pif0 of the target reduced rate of pressure increase may be equal to the standard reduced rate of increase of the braking pressure of the front wheel in the case of the braking force control system of the related art.

The first and second modified examples may be combined together, so that the standard value Pdf0 of the target pressure reduction amount and the standard value $\Delta$Pif0 of the target reduced rate of pressure increase are equal to the standard values in the case of the braking force control system of the related art.

Third Modified Example

In the illustrated embodiment, when anti-skid control starts being performed on one of the right and left front wheels, the braking pressures of the right and left rear wheels are not only increased at a reduced rate, but also controlled to the same value.

However, the braking pressures of the right and left rear wheels may be controlled to different values, so that the braking pressure of the non-anti-skid-control side rear wheel is lower than the braking pressure of the anti-skid-control side rear wheel. According to the third modified example, the yawing moment My applied to the vehicle can be further reduced to be smaller than that in the case of the above-described embodiment. The maximum difference between the braking pressures of the right and left rear wheels immediately after anti-skid control starts being performed on one of the right and left front wheels may be variably set according to the target reduction amount Pdf, so that the maximum difference increases as the target reduction amount Pdf is larger.

Figure 20:
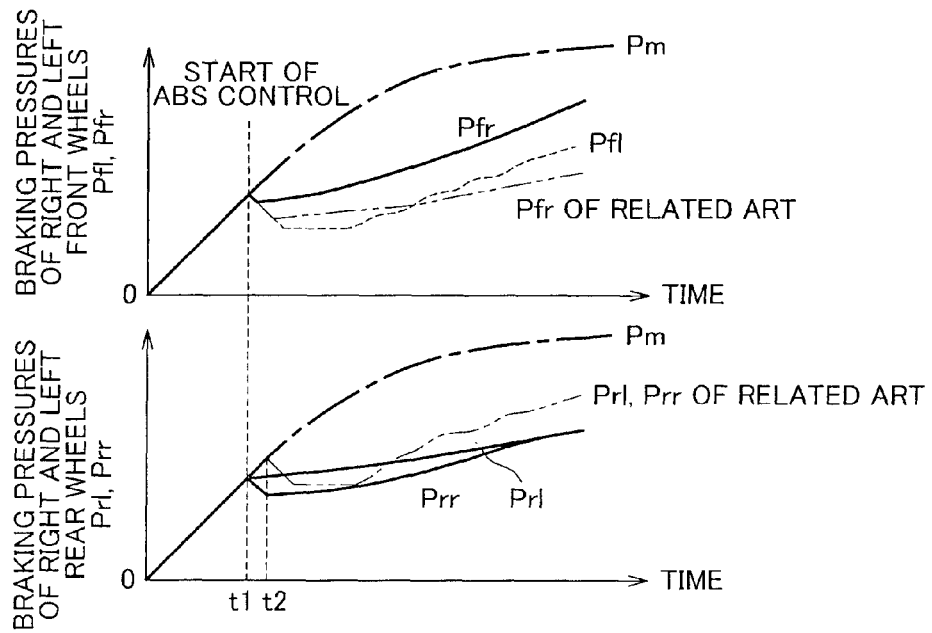
FIG. 20 is a graph showing an example of changes of braking pressures Pfr, Pfl of the right and left front wheels and braking pressures Prr, Prl of the right and left rear wheels when the brakes are applied while the vehicle is running straight on a split μ road having the lower μ on the left side and the higher μ on the right side in a third modified example.

In the third modified example, it is preferable that the amount of difference between the braking pressures of the right and left rear wheels is controlled to be gradually reduced with a lapse of time, so that a yawing moment is prevented from being applied to the vehicle in the direction opposite to that of the yawing moment My due to the difference between the braking pressures of the right and left rear wheels. FIG. 20 illustrates an example of changes of the braking pressures of the respective wheels when this control is performed while the vehicle is substantially in a straight running condition.

While one embodiment of the invention and its modified examples have been described in detail, the present invention is not limited to the above-described embodiment and modified examples, but it would be apparent to those skilled in the art that the invention may be embodied in various other forms, without departing from the scope of the invention.

In the illustrated embodiment, the electronic control unit 30 determines in step 200 whether the road on which the vehicle is running is a split μ road or not. However, this determination may be made by another unit or device, and the result of the determination may be received by the electronic control unit 30.

In the illustrated embodiment, the target pressure reduction amounts Pdf, Pdr of the braking pressures and the target reduced rates ΔPif, ΔPir of increase of the braking pressures are variably set based on the absolute value of the lateral acceleration Gy of the vehicle. However, it suffices that the target pressure reduction amounts and target reduced rates of increase of the braking pressures are variably set based on the magnitude of lateral force of the turning vehicle; therefore, the target pressure reduction amounts and target reduced rates of pressure increase may be variably set based on, for example, the product of the yawing rate of the vehicle and the vehicle speed.

While the braking pressures of the right and left rear wheels are not reduced in the case of (4-2) above in the illustrated embodiment, the braking pressures of the right and left rear wheels may be reduced in the case of (4-2), too, by a smaller amount than that in the case of (4-3) above.

In the illustrated embodiment, in the case of (4-5) above, namely, in the case where the braking pressure of the anti-skid-control side front wheel is continuously increased, the braking pressures of the right and left front wheels are increased at the same rate when the magnitude of the difference between the braking pressures of the right and left front wheels becomes smaller than the reference value P0. However, this control may be omitted.

In the illustrated embodiment, in the case of (4-6) above, namely, in the case where anti-skid control of the front wheel is finished, the braking pressures of the right and left rear wheels are increased over a given period of time at a preset rate that is higher than the target reduced rate ΔPir of pressure increase. However, the braking pressures of the right and left rear wheels may continue being increased, until the braking pressures of the right and left rear wheels become equal to a pressure level corresponding to the master cylinder pressure Pm, or become equal to a pressure level determined by the master cylinder pressure Pm and the distribution of the braking force between the front wheels and the rear wheels.

In the illustrated embodiment, the braking force of each wheel is controlled by controlling the pressure of the corresponding wheel cylinder. However, the braking force control system of the invention may be employed in a vehicle in which the braking force of each wheel is electromagnetically controlled.

The invention claimed is:

1. A braking force control system for a vehicle having a braking system configured to control a braking force applied by a brake actuator to each of right and left front wheels and right and left rear wheels independently of one another as needed, comprising:
   circuitry configured to:
   when anti-skid control starts being performed on one of the front wheels while the vehicle is running on a road having different coefficients of friction on a left side and a right side thereof, reduce the braking force applied by the brake actuator to the other front wheel laterally opposite to said one of the front wheels and then restrict an increase of the braking force applied by the brake actuator to the other front wheel, and restrict an increase of the braking force applied by the brake actuator to at least one of the right and the left rear wheels laterally opposite to said one of the front wheels,
   control an amount of the reduction of the braking force applied by the brake actuator to the other front wheel to be larger when said one of the front wheels, having the anti-skid control performed thereon, is an outer wheel of the vehicle that is turning, as compared with the case where said one of the front wheels, having the anti-skid control performed thereon, is not the outer wheel of the vehicle that is turning,
   control the amount of reduction of the braking force applied by the brake actuator to the other front wheel to be larger when said one of the front wheels is an outer wheel of the vehicle that is turning, as compared with the case where the vehicle is substantially in a straight running condition, and
   control the amount of reduction of the braking force applied by the brake actuator to the other front wheel to be smaller when said one of the front wheels is an inner wheel of the vehicle that is turning, as compared with the case where the vehicle is substantially in the straight running condition.

2. The braking force control system according to claim 1, wherein the circuitry is configured to set a degree of restriction of the increase of the braking force applied by the brake actuator to the other front wheel to be lower than the degree of restriction of the increase of the braking force applied by the brake actuator to the other front wheel in the case where the increase of the braking force of said at least one of the right and the left rear wheels is not restricted.

3. The braking force control system according to claim 1, wherein the circuitry is configured to control a degree of restriction of the increase of the braking force applied by the brake actuator to said at least one of the right and the left rear wheels to be higher than a degree of restriction of the increase of the braking force applied by the brake actuator to the other front wheel.

4. The braking force control system according to claim 1, wherein when the anti-skid control starts being performed on said one of the front wheels while the vehicle is running on the road having the different coefficients of friction on the left side and the right side thereof, the circuitry is configured to reduce the braking force of said at least one of the right and the left rear wheels, and then restrict the increase of the braking force applied by the brake actuator to the other front wheel.

5. The braking force control system according to claim 4, wherein the circuitry is configured to control an amount of reduction of the braking force applied by the brake actuator to said at least one of the right and the left rear wheels to be larger than the amount of reduction of the braking force applied by the brake actuator to the other front wheel.

6. The braking force control system according to claim 1, wherein the circuitry is configured to control the braking forces of the right and the left rear wheels to be a same value.

7. The braking force control system according to claim 1, wherein, when the braking force applied by the brake actuator to said one of the front wheels is continuously increased under the anti-skid control and a magnitude of a difference between the braking forces applied by the brake actuator to the right and the left front wheels is equal to or smaller than a reference value, the circuitry is configured to increase the braking force applied by the brake actuator to the other front wheel in accordance with the increase of the braking force applied by the brake actuator to said one of the front wheels.

8. The braking force control system according to claim 1, wherein
when the anti-skid control performed on said one of the front wheels ends, the circuitry is configured to end the restriction of the increase of the braking force applied by the brake actuator to said at least one of the right and the left rear wheel.

9. The braking force control system according to claim 1, wherein
the circuitry is configured to control a degree of restriction of the increase of the braking force applied by the brake actuator to each of the wheels of which the increase of the braking force is restricted to be higher when said one of the front wheels is the outer wheel of the vehicle that is turning, as compared with the case where said one of the front wheels is not the outer wheel of the vehicle that is turning.

10. The braking force control system according to claim 1, wherein
the circuitry is configured to control a degree of restriction of the increase of the braking force when said one of the front wheels is the outer wheel of the vehicle that is turning to be higher as a magnitude of a lateral force applied to the vehicle during turning is larger.

11. The braking force control system according to claim 1, wherein
the circuitry is configured to control the amount of reduction of the braking force applied by the brake actuator to the other front wheel when said one of the front wheels is the outer wheel of the vehicle that is turning to be larger as a magnitude of a lateral force applied to the vehicle during turning is larger.

12. The braking force control system according to claim 1, wherein
the circuitry is configured to control a degree of restriction of the increase of the braking force applied by the brake actuator to each of the wheels of which the increase of the braking force is restricted to be lower when said one of the front wheels is an inner wheel of the vehicle that is turning, as compared with the case where said one of the front wheels is not the inner wheel of the vehicle that is turning.

13. The braking force control system according to claim 1, wherein
the circuitry is configured to control an amount of reduction of the braking force applied by the brake actuator to each of the wheels of which the braking force is reduced to be smaller when said one of the front wheels is an inner wheel of the vehicle that is turning, as compared with the case where said one of the front wheels is not the inner wheel of the vehicle that is turning.

14. The braking force control system according to claim 1, wherein
the circuitry is configured to control a degree of restriction of the increase of the braking force when said one of the front wheels is an inner wheel of the vehicle that is turning to be lower as a magnitude of a lateral force applied to the vehicle during turning is larger.

15. The braking force control system according to claim 1, wherein
the circuitry is configured to control an amount of reduction of the braking force applied by the brake actuator to the other front wheel when said one of the front wheels is an inner wheel of the vehicle that is turning to be smaller as a magnitude of a lateral force applied to the vehicle during turning is larger.

* * * * *